United States Patent [19]

Axelrod et al.

[11] Patent Number: 4,862,386
[45] Date of Patent: * Aug. 29, 1989

[54] APPARATUS FOR PREPARING A LETTER

[75] Inventors: Barry H. Axelrod, Newtown; Robert T. Durst, Jr., Monroe; Kevin D. Hunter, Stratford; Alfred C. Schmidt, Wilton, all of Conn.

[73] Assignee: Pitney Bowes Inc., Stamford, Conn.

[ * ] Notice: The portion of the term of this patent subsequent to Jan. 24, 2006 has been disclaimed.

[21] Appl. No.: 25,537

[22] Filed: Mar. 13, 1987

[51] Int. Cl.[4] .................. G06F 15/20; B65H 39/02
[52] U.S. Cl. ................................. 364/518; 235/375; 364/464.02; 364/478
[58] Field of Search ................ 364/518–521, 364/523, 478, 464.02; 340/709, 723; 235/375; 270/58

[56] References Cited

U.S. PATENT DOCUMENTS

| | | | |
|---|---|---|---|
| 4,385,361 | 5/1983 | Moates | 364/520 |
| 4,495,491 | 1/1985 | Postl | 340/709 |
| 4,648,047 | 3/1987 | Berkland et al. | 364/519 |
| 4,677,571 | 6/1987 | Riseman et al. | 364/519 |
| 4,800,504 | 1/1989 | Durst, Jr. et al. | 364/478 |
| 4,800,506 | 1/1989 | Axelrod et al. | 235/375 X |

Primary Examiner—Gary V. Harkcom
Assistant Examiner—H. R. Herndon
Attorney, Agent, or Firm—Donald P. Walker; Melvin J. Scolnick; David E. Pitchenik

[57] ABSTRACT

Apparatus for preparing a letter, including a stationery item. The apparatus includes a structure for printing and for providing a signal representative of letter data corresponding to information having a format. The information includes a plurality of parts. The apparatus also includes a computer. The computer includes a structure for receiving the signal, and is programmed for reformatting the letter data. The reformatted letter data includes a plurality of parts, and each of the information parts corresponds to a different one of the data parts. The computer is also programmed for selecting at least one of the data parts and for causing the printing structure to print on the stationery item each information part corresponding to each selected data part.

53 Claims, 17 Drawing Sheets

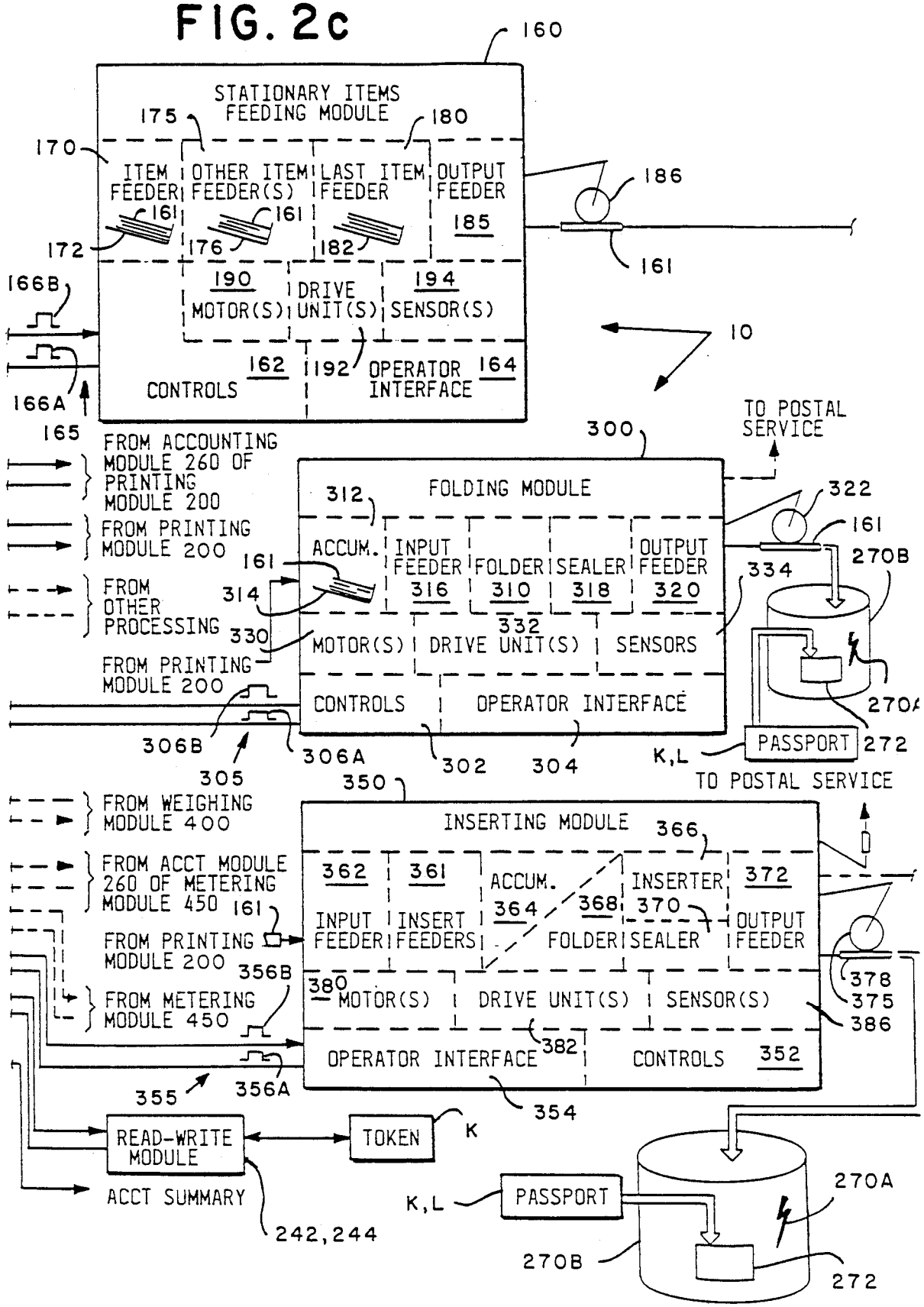

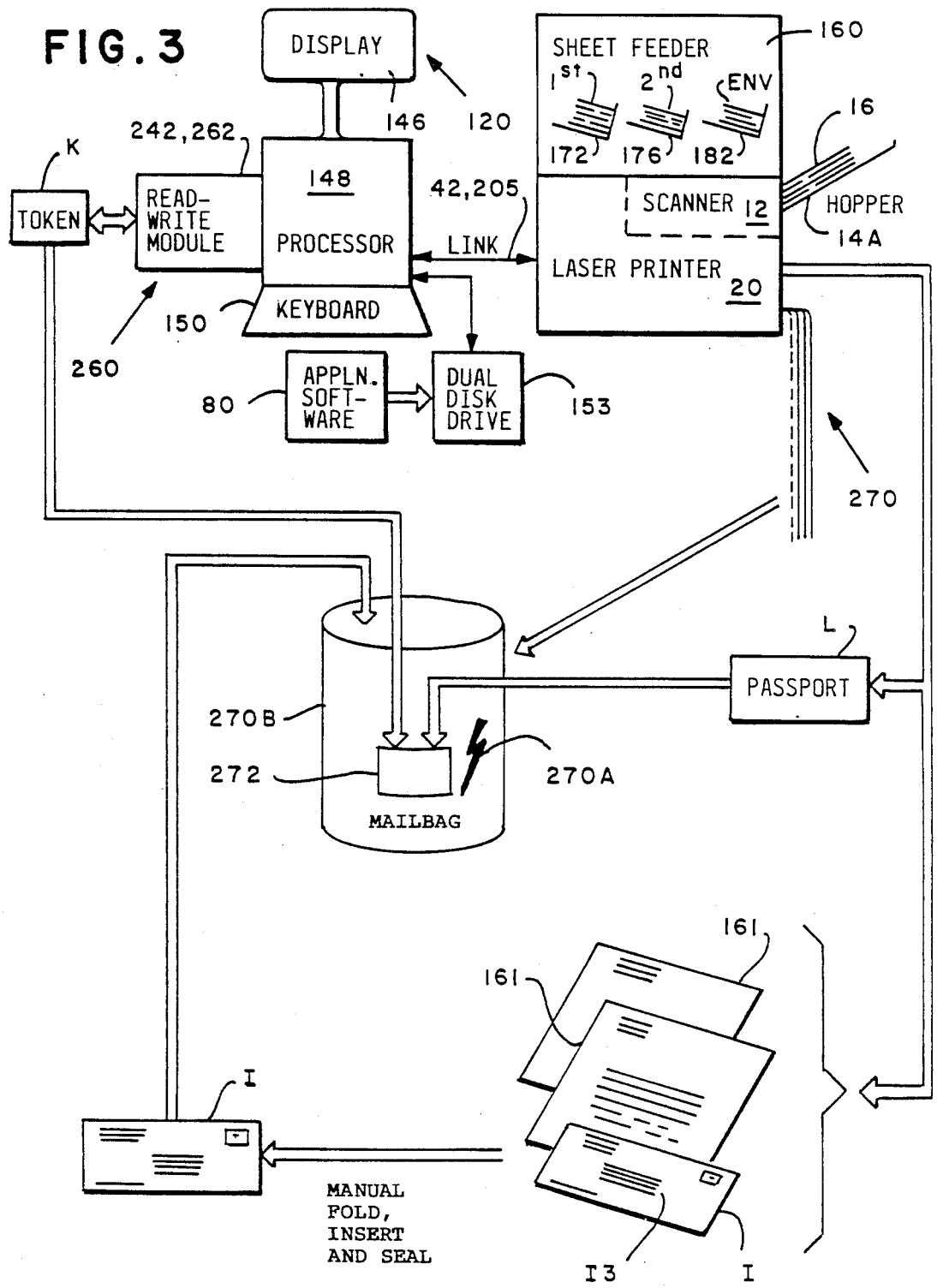

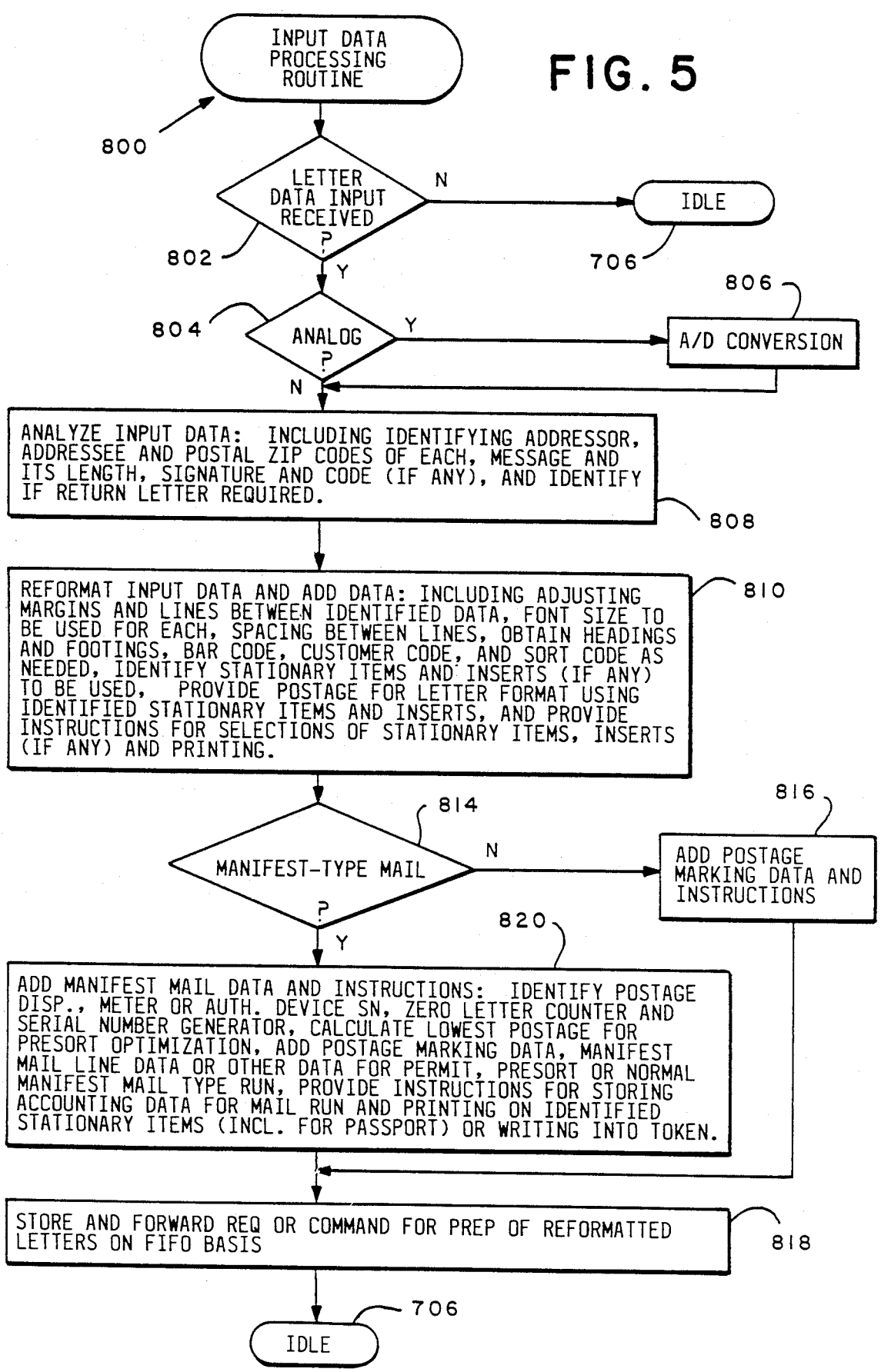

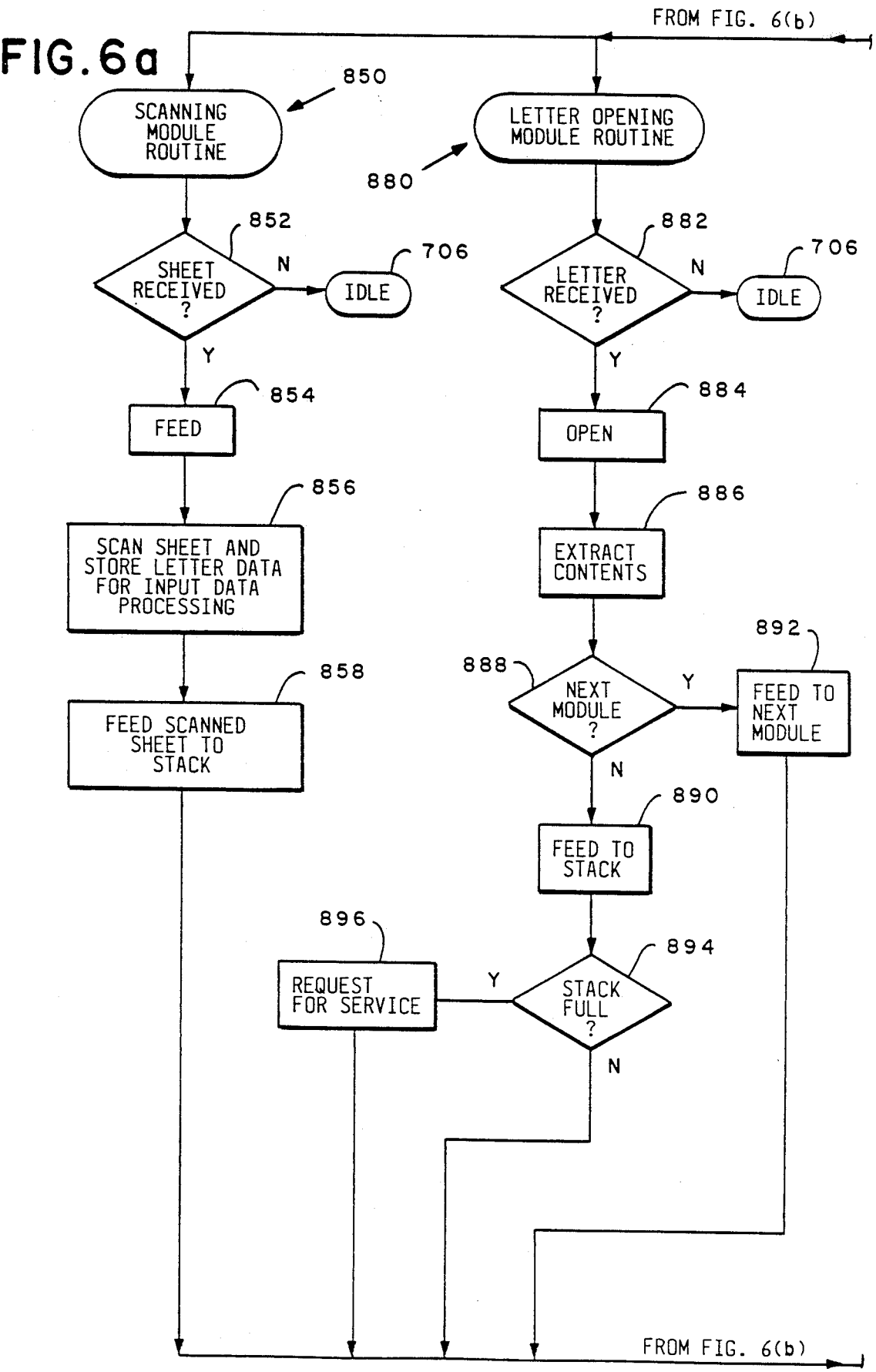

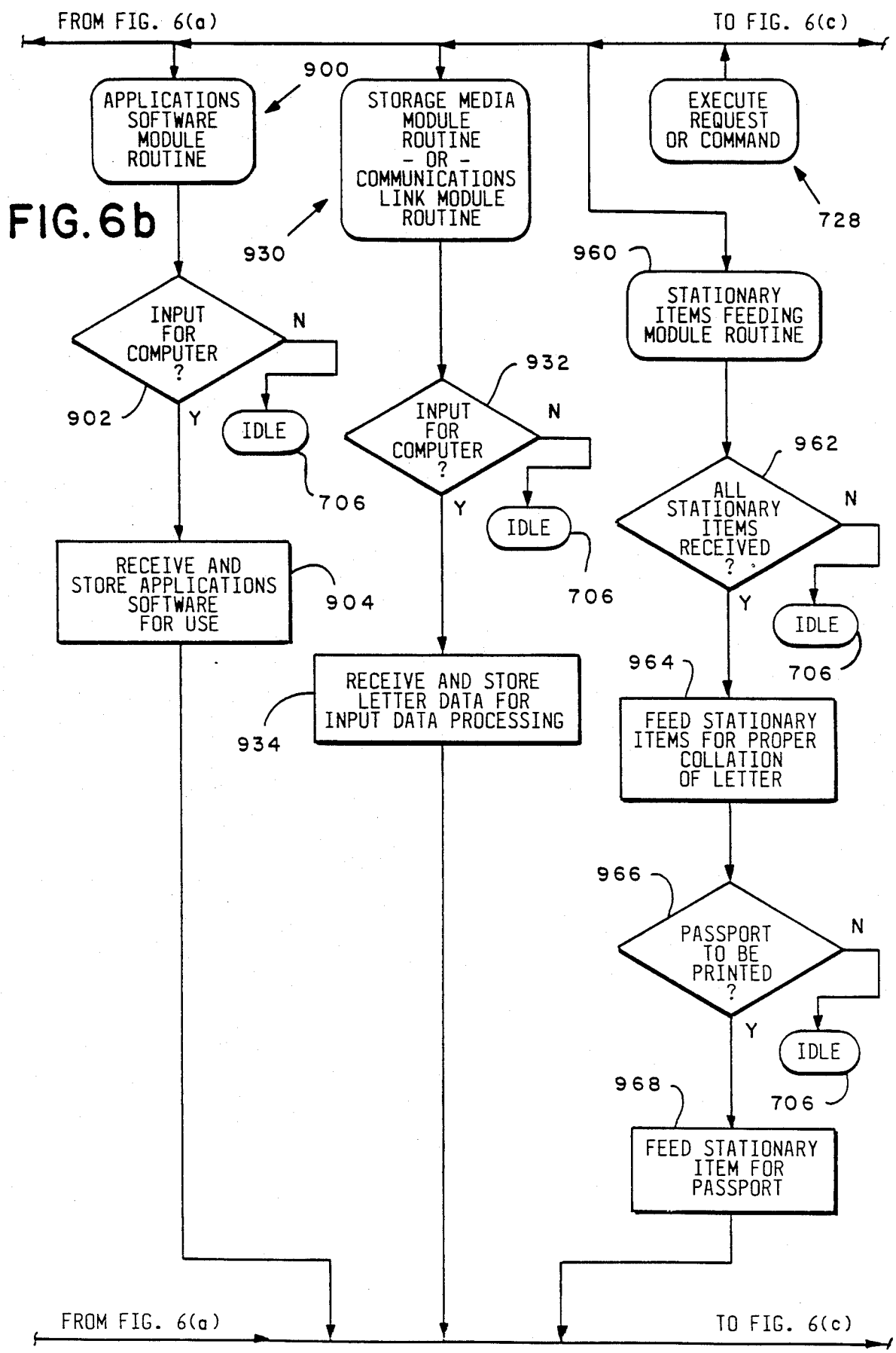

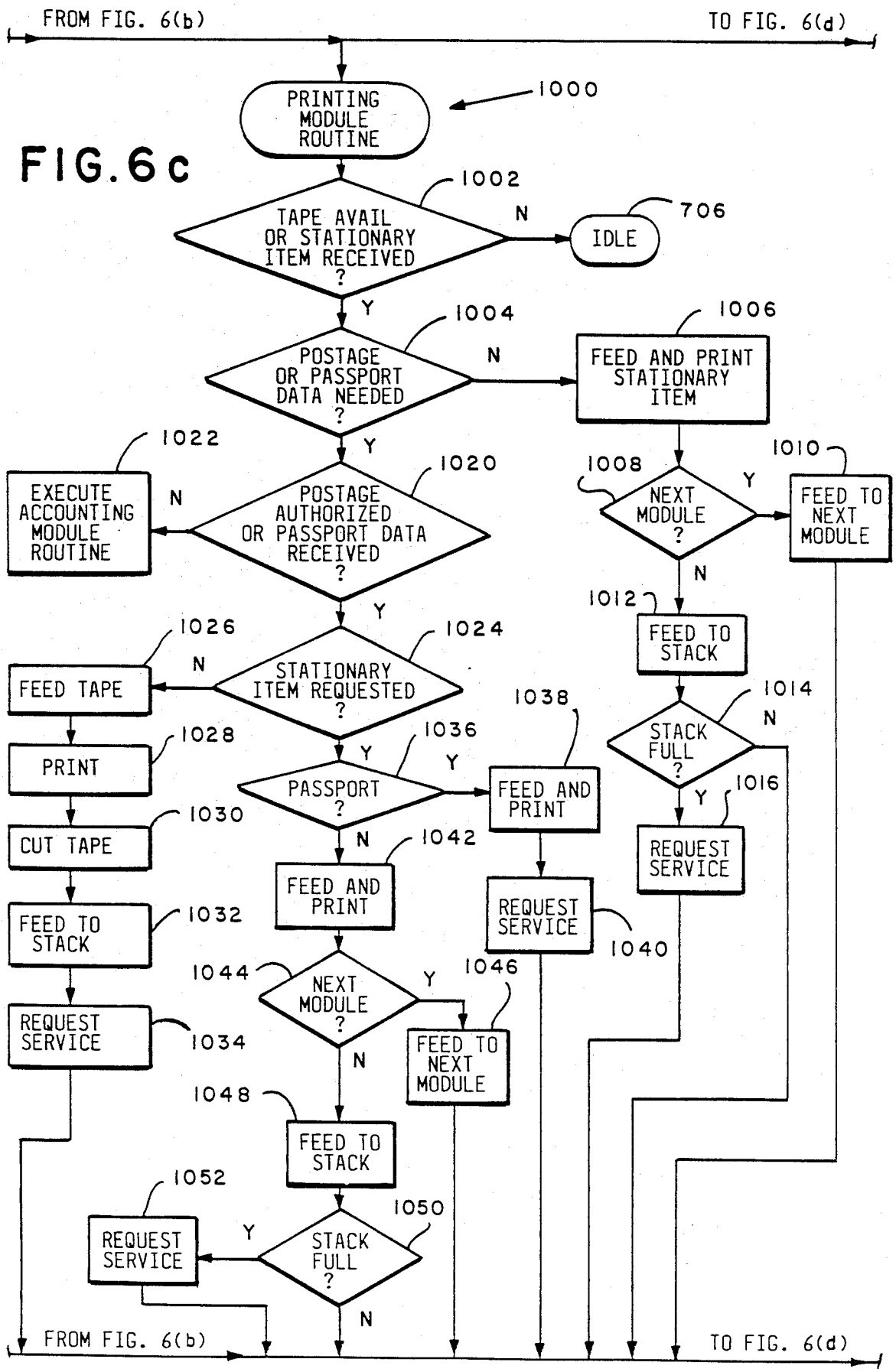

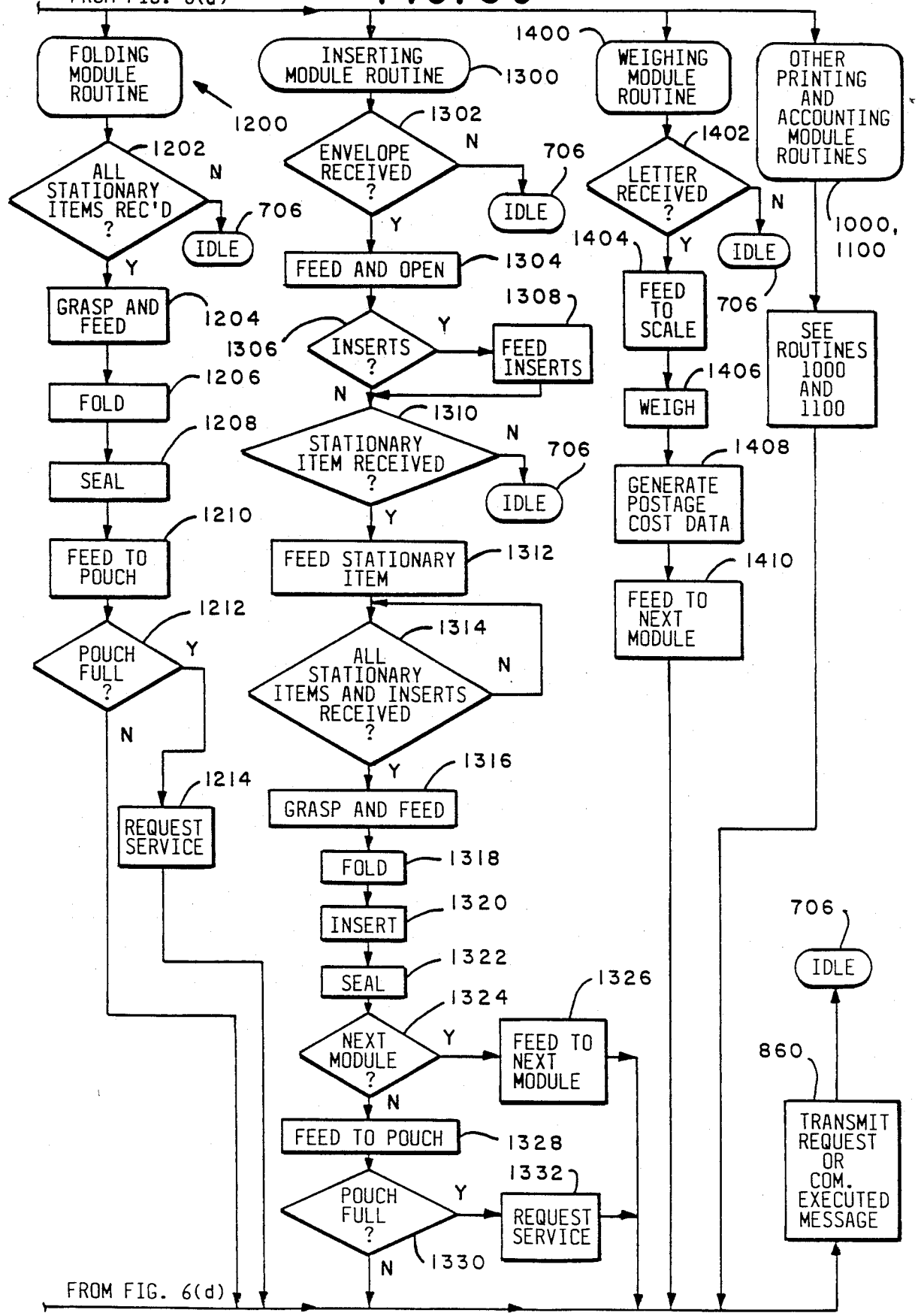

APPARATUS FOR PREPARING A LETTER

BACKGROUND OF THE INVENTION

This invention is generally concerned with apparatus for preparing, processing and delivering letters, and more particularly with a modularly constructed, computer controlled system for generating, transmitting and printing formal business letters including letter mail.

A large proportion of the business offices of industrialized nations are equipped with modern word processing apparatus, the use of which has reduced the cost of preparing formal business letters and relieved secretarial personnel of many of the traditionally labor intensive activities inherent in the task of preparing such letters. A continuing need exists however for further reducing the cost of preparation of such letters due to increases in labor costs involved in such activities. In addition it is noted that relatively little progress has been made in the way of reducing labor costs associated with the distribution of such letters after preparation. For the most part, modernization of the distribution process has focused upon rapid delivery, as opposed to cost reduced delivery, of such letters. For example, numerous private carriers and the U.S. Postal Service have inaugurated rapid but costly delivery systems for distributing time sensitive business letters.

Further, although it may appear that facsimile transmission systems, which have been installed in most of such business offices for the transmission of business letters via telephone lines, have resulted in distribution savings, since many of facsimile transmissions are followed by delivery of the formal letters, either as a business courtesy or due to it being imperative for legal documentation purposes to provide original letters, savings are not realized.

On the other hand, conventional apparatus, although available for performing major functions that are useful for further reducing the cost of preparing business letters and, in addition, significantly reducing the cost of delivering such letters, have either not been adapted for such use or not been recognized as being useful for such purposes.

In connection with seeking a solution to the problem of high mail distribution costs, the assignee of the present invention has recently introduced a bulk mail processing system for large business mailers. This system permits such mailers to deliver mailpieces which, rather than including a stamp, postage indicia or a permit mail notation, include a serial number and written line of information. The serial number is located in the mailpiece's "stamp" area, whereas the written line of information is associated with the addressee area of the mailpiece. In addition to including the postage cost, the written line includes other relevant information required by the Postal Service, including the serial number of the apparatus which was used for printing the postage cost. Such bulk mailings must be accompanied by a manifest, known in the art as a passport, which reports, for example, the total postage cost, piece count and class or classes of mail of the bulk mailing, the serial number of the postage dispensing apparatus utilized for processing the mailpieces, and other relevant data concerning the bulk mailing.

Apart from the foregoing there are other cost-effective distribution systems available to large bulk mailers that are unavailable to small bulk mailers. For example, permit and pre-sort bulk mailings have been available to large bulk mailers for many years. As with manifest bulk mailings, permit mail must be delivered to the Postal Service during normal business hours for inspection and verification purposes. To that end, an inspection location is provided by the Postal Service, where the mailing costs are calculated and paid before the permit mail is routed to the general mailstream for processing along with mail picked up by the Postal Service at local mailboxes. Similarly, presorted bulk mailings are inspected to verify that the mailpieces have been pre-sorted, and, therefore, entitled to the reduced postage cost permitted for handling pre-sorted mail.

The aforesaid manifest, permit and pre-sort bulk mailings must be delivered to the Postal Service during normal business hours for verification and cannot be delivered to local mailboxes, which are used extensively by small business mailers, for pick-up by the Postal Service. Although such systems are cost-effective for large business mailers who are equipped to handle tens of thousands of letters, small business mailers cannot avail themselves of their benefits due to the smaller volumes of mail involved and unavailability of mail processing apparatus, or both. Thus, there is a need in the business community to provide small business mailers with bulk mailing systems and apparatus for processing mail which permits them to participate in the manifest, permit and pre-sort bulk mailing programs of the Postal Service. And, preferably such apparatus should allow for the use of local mailbox deliveries, outside of the normal business hours of the Postal Service.

Aside from all of the foregoing it is noted that there has been a long felt need in the business community to avoid using see-through type envelopes for sending advertising materials to prospective customers, due to such envelopes being extensively used by the business community for mailing monthly billings. Because of such usage, see-through type envelopes involve such a negative reaction in potential customers to whom advertising materials are directed, that they are as often as not disposed of without being opened, although the enclosed contents of the envelope might have persuaded the recipient to become a customer had the contents been read by the recipient.

Accordingly:

An object of the invention is to provide improvements in apparatus for preparing letters;

Another object is to provide improvements in methods and apparatus for processing letters;

Another object is to provide methods and apparatus for reducing the cost of preparation and delivery of letters, including bulk and letter mail;

Another object is to provide improvements in methods and apparatus for generating, transmitting or printing letters, including bulk and letter mail; and, Another object is to provide modularly constructed apparatus and systems for preparing, processing, and delivering formal business letters, including bulk and letter mail.

SUMMARY OF THE INVENTION

Apparatus for preparing a letter including a stationery item, said apparatus comprising: printing means; means for providing a signal representative of letter data corresponding to information having a format, said information including a plurality of parts; and computer means, said computer means including means for receiving said signal, said computer means including means for reformatting said letter data, said reformatted letter data including a plurality of parts, each of said information parts corresponding to a different one of said data parts, said computer means including means for selecting at least one of said data parts, and said computer means including means for causing said printing means to print on said stationery item each information part corresponding to each selected data part.

BRIEF DESCRIPTION OF THE DRAWINGS

As shown in the drawings wherein like reference numeral designate like or corresponding parts throughout the several views:

FIG. 2(c) is a schematic view of a plurality of modules adapted to be controlled by the computer of FIG. 2(a) for processing stationery items according to the invention;

FIG. 3 is a schematic view of apparatus for preparing letters for bulk mailing and manifesting;

FIG. 5 is a flow chart showing the processing steps implemented by the input data processing program, of the computer shown in FIG. 2;

FIG. 6(a) is a flow chart showing the processing steps implemented by the programs of the computer shown in FIG. 2(b) for controlling operation of the scanning and letter opening modules shown in FIG. 2(a);

FIG. 6(b) is a flow chart showing the processing steps implemented by the programs of the computer shown in FIG. 2(b) for controlling operation of the applications software, storage media, communications link and stationery items feeding modules shown in FIG. 2(a):

FIG. 6(c) is a flow chart showing the processing steps of the printing module program of the computer shown in FIG. 2(b) for controlling operation of the respective printing modules shown in FIG. 2(d);

DESCRIPTION OF THE PREFERRED EMBODIMENTS

FIGS. 1(a)–1(e) inclusive show examples of various types of business stationery items and accounting materials which may be utilized in accordance with the present invention for preparing and processing letters, including letter mail.

Figure 1A:
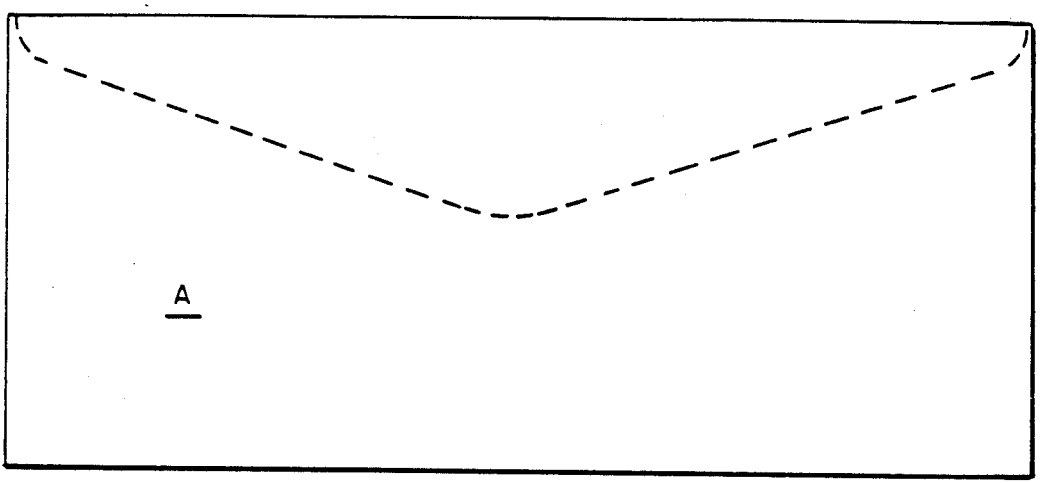
FIG. 1(a) is a front view of a bond paper envelope which may be utilized as a stationery item according to the invention.

FIG. 1(a) shows a high quality bond paper envelope A, of the type that may be used in a business office for business correspondence as well as for personal correspondence and other informal purposes. The envelope A exemplifies a type of stationery item which is devoid of any pre-printed markings prior to utilization and which may be processed utilizing the apparatus according to the invention.

Figure 1B:
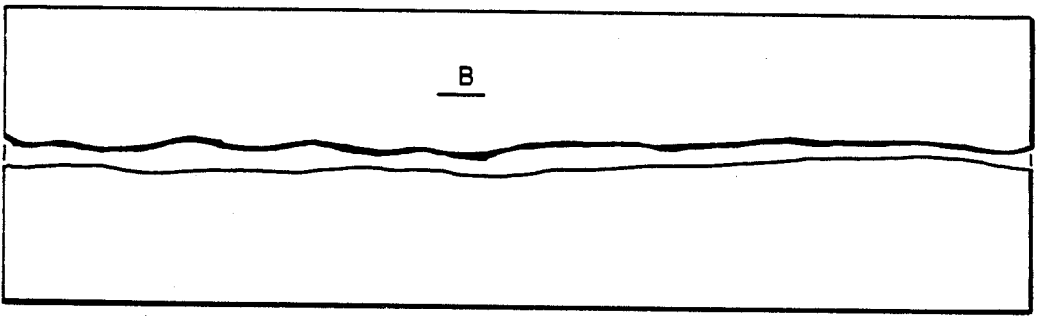
FIG. 1(b) is a front view of a bond paper sheet which may be utilized as a stationery item according to the invention.

FIG. 1(b) shows a high quality bond paper sheet B, of the type that may be used in a business office for personal correspondence or other informal purposes, or as a second or subsequent page of a formal business letter, or for portraying graphic information to be included with any type of letter. Like the envelope A of FIG.

1(a), the sheet B exemplifies a type of stationery item which is devoid of any pre-printed markings prior to utilization, and which may be processed utilizing apparatus according to the invention.

Figure 1C:
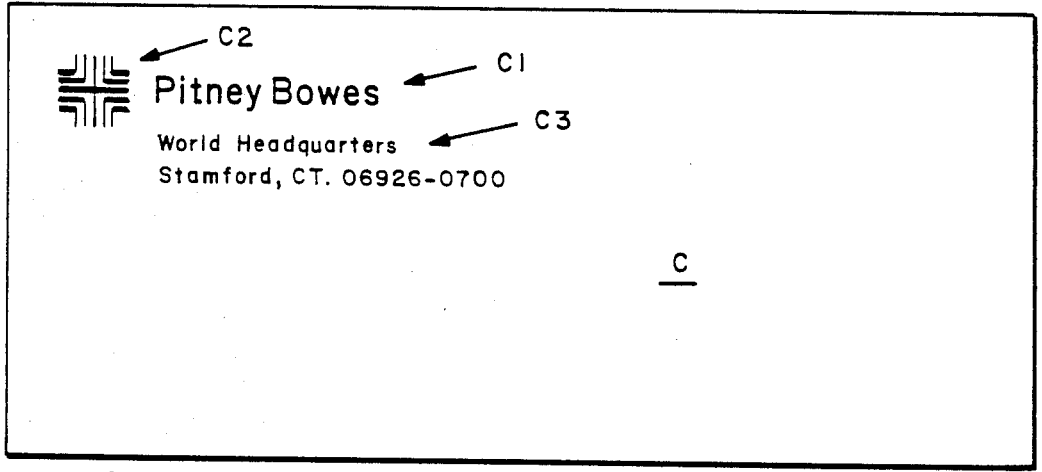
FIG. 1(c) is a front view of a printed bond paper envelope which may be utilized as a stationery item according to the invention, showing alphanumeric and graphic letter head printing of the type that may be pre-printed or printed according to the invention.

FIG. 1(c) shows a high quality bond paper envelope C, of the type that may be used in a business office for formal business correspondence. An envelope C typically includes the business tradename C1, in the upper left-hand quadrant of the envelope C, alone or in combination with a tradename design C2, of the business mailer, or addressor, who is the owner of the tradenames C1 and C2. The envelope C may also include the location C3 of the addressor, who, for the sake of convenience, has been chosen to be the assignee of the present invention. The envelope C exemplifies a type of business stationery item which includes pre-printed markings C1, C2 and C3 prior to utilization, although it is within the scope of the invention to provide apparatus for printing the alphanumeric and graphic information forming one or more of the markings C1, C2 and C3 on a partially marked envelope C, or on an unmarked envelope such as the envelope A shown in FIG. 1(a).

Figure 1D:
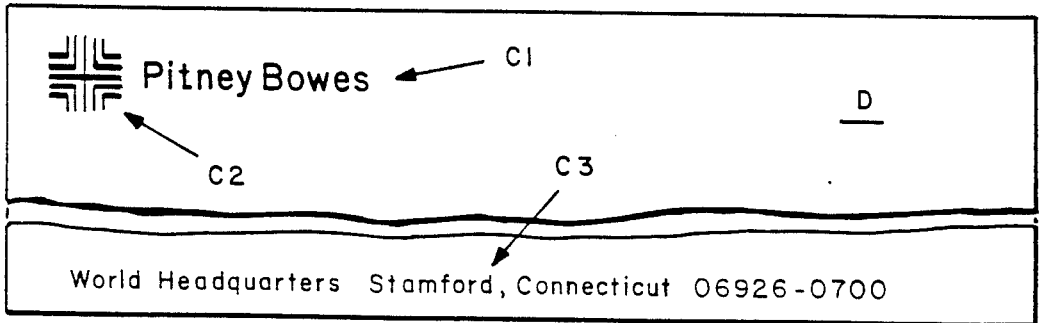
FIG. 1(d) is a front view of printed bond paper sheet, which may be utilized as a stationery item according to the invention, showing alphanumeric and graphic letter head and foot printing of the type that may be pre-printed or printed according to the invention.

FIG. 1(d) shows a high quality bond paper sheet D, of the type that may be used in a business office as a first page of formal business correspondence. Like the envelope C of FIG. 1(c), the sheet D typically includes the business tradename C1 (FIG. 1(d)), alone or in combination with a tradename design C2, of the business mailer who is the owner of the tradenames C1 and C2. Further, the sheet D may also include the business location C3 of the addressor located in the lower left-hand quadrant of the sheet D, although it is within the scope of the invention to provide the location part of the address of the addressor in any position on the sheet D, including in the upper left-hand quadrant as shown in FIG. 1(c) or to the right of the tradename C1. The sheet D exemplifies another type of business stationery item which includes pre-printed markings C1, C2 and C3 prior to utilization, although it is within the scope of the invention to provide apparatus for printing the alphanumeric and graphic information forming one or more of the markings C1, C2 and C3 on a partially marked sheet D or on an unmarked sheet, such as the sheet B shown in FIG. 1(b).

Figure 1E:
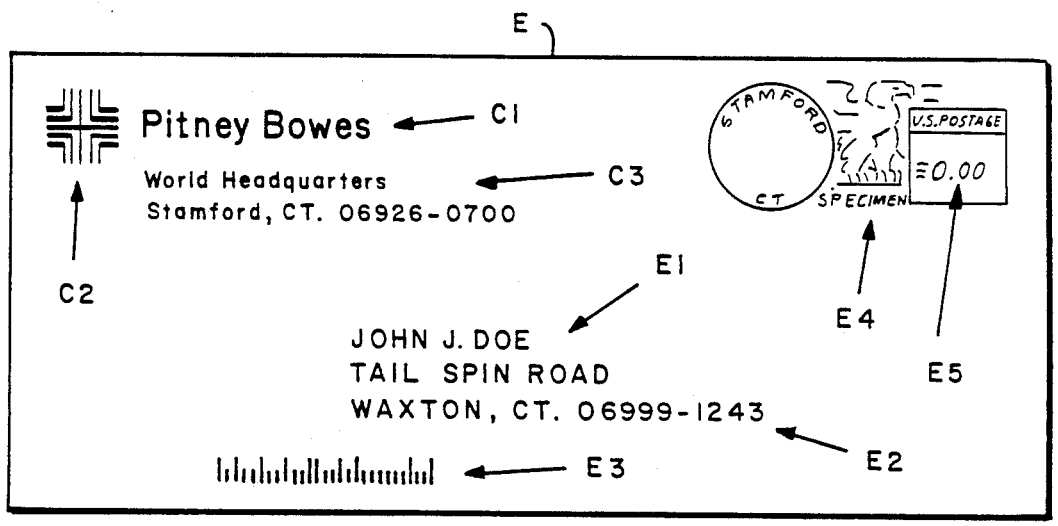
FIG. 1(e) is a front view of a printed bond paper envelope, of the type shown in FIG. 1(c), including postage indicia and address information which may be printed according to the invention for preparing a business envelope.

FIG. 1(e) shows an envelope E, similar to the envelope C shown in FIGS. 1(c), which includes the tradenames and address information C1, C2 and C3 as shown in FIG. 1(c), and, in addition, includes the address E1, including the name, of the addressee of the envelope E. In addition the envelope E has printed thereon the addressee's postal zip code E2, a typical bar code E3 which exemplifies any postal bar code and, although not accurately portrayed, is intended to be representative of the postal bar code corresponding to the postal zip code E2, and a postage indicia E4 of a typical postage meter manufacturer, which, for convenience, has been chosen to be the postage indicia E4 of the assignee of the present invention. In connection with the foregoing it is noted that the bar code E3 is located in the lower left hand quadrant of the envelope E, although current U.S. Postal Regulations require such postal bar codes to be located in the lower right quadrant. This has been done to exemplify the fact that in accordance with the invention, the apparatus hereinafter discussed may be adapted for printing bar codes in any location on any given stationery item. The postage indicia E4 includes a postage value E5, which is representative of any postage value that is needed for mailing the envelope and its contents of other printed stationery items to the addressee E1. The envelope E, exemplifies a typical stationery item which has printed thereon alphanumeric and graphic information, C1, C2, C3, E1, E2, E3 and E4, which may be printed utilizing apparatus according to the present invention.

Figure 1F:
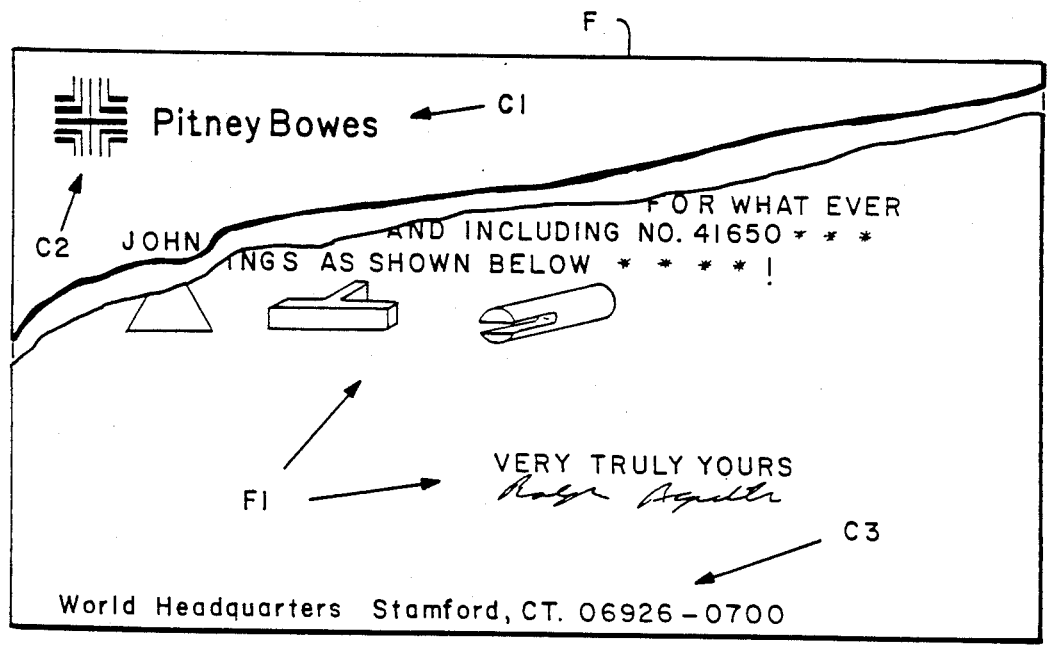
FIG. 1(f) is a front view of a printed bond paper sheet, of the type shown in FIG. 1(d), including alphanumeric and graphic information which may be printed according to the invention for preparing a business letter.

FIG. 1(f) shows a sheet F, similar to the sheet D shown in FIGS. 1(d), which includes the tradenames and address information C1, C2 and C3 as shown in FIG. 1(d), and, in addition, includes alphanumeric and graphic information F1 which may be printed on the first or any subsequent page of a business letter. The sheet E exemplifies a typical stationery item including alphanumeric and graphic information, C1, C2 and F1, which may be printed on a stationery item utilizing apparatus according to the present invention.

Figure 1G:
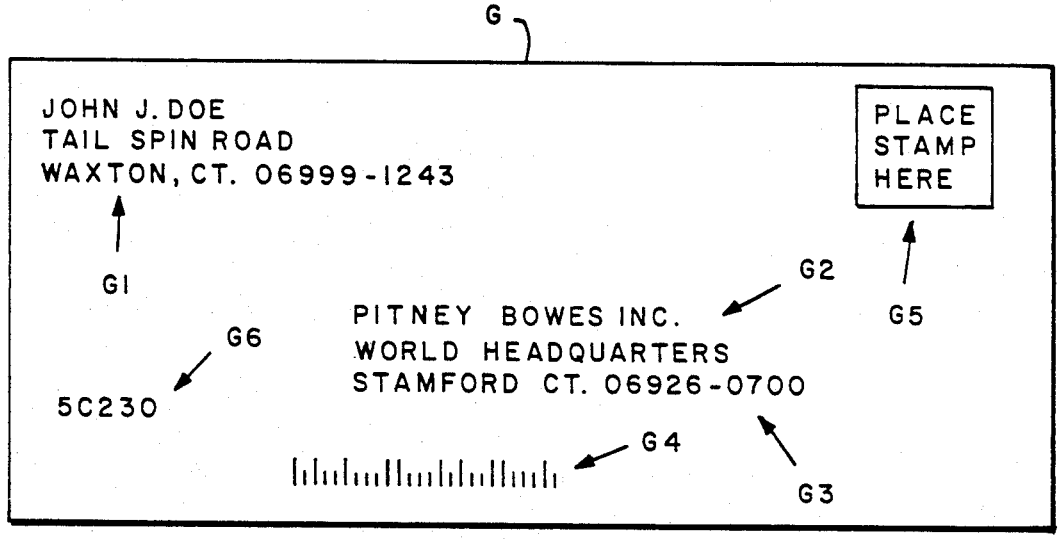
FIG. 1(g) is a front view of a printed bond paper envelope, of the type shown in FIG. 1(a), including alphanumeric and graphic information which may be printed according to the invention for preparing a return envelope.

FIG. 1(g) shows an envelope G, similar to the envelope A shown in FIG. 1(a), which includes the address G1, including the name, of a typical addressor in the upper left-hand quadrant of the envelope G, and the name, including the address G2, of a typical addressee G2 in the lower right-hand quadrant. The address G2 includes the postal zip code G3 of the addressee. The envelope G additionally has printed thereon the bar code G4 corresponding to postal zip code G3 of the addressee and a typical postage franking reminder note G5 located in the upper right hand quadrant. Further, the envelope G includes a code G6 located in the lower left-hand quadrant. The code G6 may be any code assigned by the addressee of the envelope G for identifying the envelope G, or the addressor of the envelope G, for remittance mail processing purposes. The envelope G is dimensioned for insertion in an envelope, such as the envelope E shown in FIG. 1(e), for return to the business-mailer. The envelope G is representative of a typical return-envelope type of stationery item, which includes alphanumeric and graphic information, G1–G6 inclusive, which may be printed utilizing the apparatus according to the present invention.

Figure 1H:
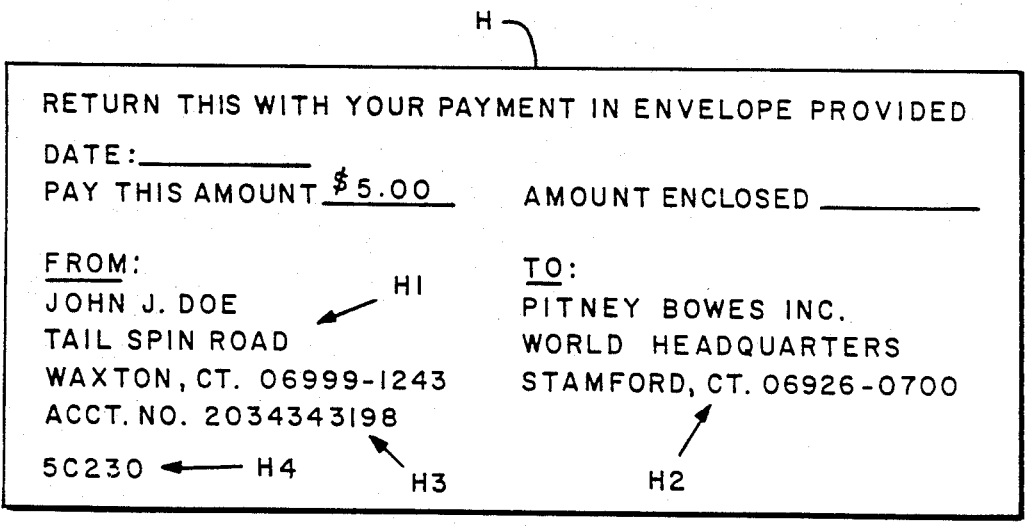
FIG. 1(h) is a front view of a printed bond paper sheet, of the type shown in FIG. 1(b), including alphanumeric information which may be printed according to the invention for preparing a remittance slip.

FIG. 1(h) shows a sheet H, similar to the sheet B shown in FIG. 1(b), which is provided with the address H1, including the name, of the addressor in the lower left-hand quadrant. The sheet H also includes the address H2, including the name, of the addressee in the lower right-hand quadrant. The sheet H is additionally provided with the account number H3 of the addressor as assigned by the addressee, in this instance Pitney Bowes Inc. The sheet H is intended to be an invoice in the form of typical remittance slip. To that end, the sheet H preferably includes the aforesaid customer account number H3, which may be any number or alphanumeric identifier of the customer, including the customer's tax code, social security number, or the like. A code H4 may also be provided for identifying the sheet H for sortation purposes. When the sheet H is returned by the customer-addressee, in this instance John T. Doe, the sheet H may be processed by apparatus controlled by a computer program implemented in response to such apparatus sensing the presence of the code H3 or H4. Assuming use of the code H3, the computer may be programmed for causing the operation of other apparatus, for example a printer to print a message indicating that the remittance slip of a particular customer has been received. In any event, the code H4 or account number H3, or both may be provided for identifying the sheet H, customer, or both, and, upon return to the addressee, may be used for generating data for causing machine operations and for other purposes, as more fully described in U.S. Pat. No. 4,800,504 of Robert T. Durst, Jr. et al for Interactive Outgoing and Incoming Mailpiece Processing system, assigned to the assignee of the present invention and filed concurrently herewith. The sheet H is representative of a typical remittance-slip type of stationery item, including alphanumeric information H1–H4 inclusive, which may be printed utilizing the apparatus according to the present invention.

Figure 1I:
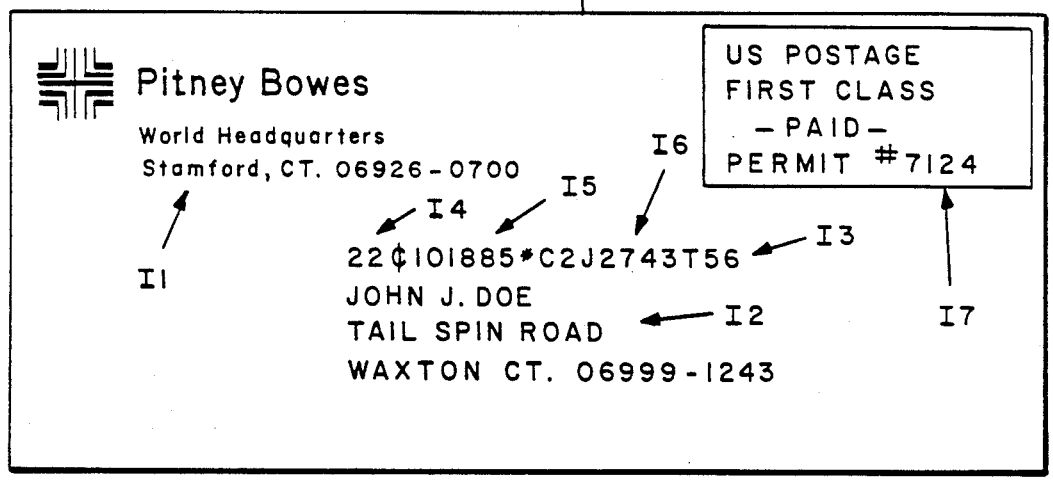
FIG. 1(i) is a front view of a printed bond paper envelope, of the type shown in FIG. 1(c), including alphanumeric and graphic information which may be printed according to the invention for preparing a bulk mailing envelope.

FIG. 1(i) shows an envelope I, similar to the envelope A shown in FIG. 1(a), which has been provided with the address I1, including the name, of the addressor in the upper left-hand quadrant of the sheet I, and the address I2, including the name, of the addressee spanning the lower left and right hand quadrants. In addition, the sheet I has been provided with a line of mailing information I3, which may but need not be the first line above the address I2 of the addressee. The mailing information I3 may include the postage value noted at I4, or another number or series of characters uniquely assigned to a particular mailpiece for delivery to a Postal Service with a single passport as hereinafter discussed, for mailing the envelope I. In addition the mailing information I3 may include the date of mailing I5, followed by a multi-digit accounting code I6, such as an alphanumeric code which is the serial number of the postage metering apparatus, or other source of supply of available postage, which was utilized for dispensing the postage value noted at I4. Further the code I6 may include a number corresponding to the amount of postage remaining in the postage dispensing or other apparatus which was utilized for dispensing the postage cost I4 after deduction of that cost. The envelope I is also is provided with a typical postage paid marking I7, which may include a permit or other number identifying the postal service contractor, or permittee, who was granted the right by the Postal Service to mark mailpieces as shown. Rather than identifying the permittee, the number or code provided with the postage paid marking I7 may be a number corresponding to a count of the number of mailpieces, including the mailpiece shown, processed by the postage metering apparatus, or other source of supply of postage, which was utilized for dispensing the postage value noted at I4. The envelope I exemplifies a typical stationery item which has printed thereon alphanumeric and graphic information, I1–I7 inclusive, for preparing mailpieces for bulk mailing, in accordance with the invention, utilizing the apparatus according to the invention.

Figure 1J:
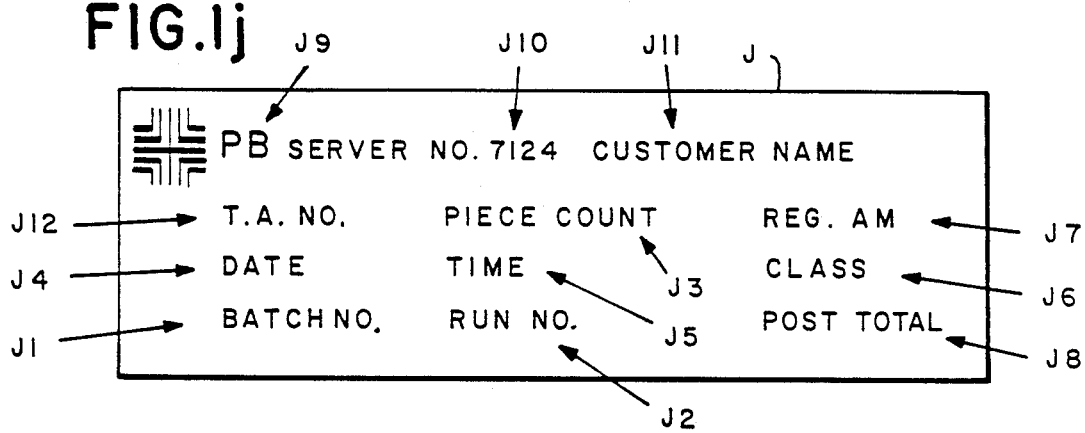
FIG. 1(j) is a front view a printed bond paper sheet, of the type shown in FIG. 1(b), including alphanumeric and graphic information which may be printed according to the invention for preparing a passport.

FIG. 1(j) shows a sheet J, similar to the sheet B shown on FIG. 1(b), which has printed thereon a summary of relevant bulk mailing data of the type that may be required by a Postal Service Agency to account for the total of all postage used by a business mailer when preparing a bulk mailing of postage-paid mailpieces utilizing envelopes such as the envelope I shown in FIG. 1(i). Such mailpieces are preferably delivered to the Postal Agency in a sealed, distinctively marked envelope or mail pouch, to which there has been attached or otherwise removably included summary of accounting information concerning the contents of the sealed envelope or mail pouch. The summary of accounting information is referred to by skilled artisans as a "passport". Typically, such a passport may include a code or other number J1 identifying the "batch" of postage paid mailpieces with which the particular passport is delivered to the Postal Service, and, assuming the particular batch of mailpieces consists of more than one "run", or part of larger batch, the passport may include a number identifying the particular run of mailpieces. Accordingly, a given batch of mailpieces may be delivered as a series of runs of a batch of mailpieces each of which includes a passport identifying the run number J2 as well as the batch number J1. In addition the passport may include a piece count J3 consisting of a count of the mailpieces delivered with the passport, the date J4 and time J5 the last mailpiece included in the run or batch was processed by the postage dispensing device utilized for preparing the mailpieces, a number or name indicating the mailing classification J6 of the mailpieces, a number J7 corresponding to the total of all postages remaining stored in the descending register of the postage dispensing device utilized for processing the mailpieces included in the run or batch, and the total of all postage used J8 for processing all of the mailpieces included in the run or batch. In addition the summary would ordinarily include the name of the manufacturer J9, serial number J10, and user J11 of the postage dispensing device utilized for processing the mailpieces in the run or batch, and, may also include a transaction number J12. The transaction number may be a code or serial number which uniquely distinguishes the run or batch referred to in the passport from all other runs or batches processed by the particular postage dispensing device utilized for preparing the mailpieces included in the run or batch, or processed by the particular postage dispensing device since it was last credited with a postage amount available for printing. The sheet J, thus exemplifies a typical stationery item which has printed thereon alphanumeric and graphic information, J1–J12 inclusive, for preparing a passport for delivery with a bulk mailing of mailpieces, utilizing the apparatus according to the present invention.

Figure 1K:
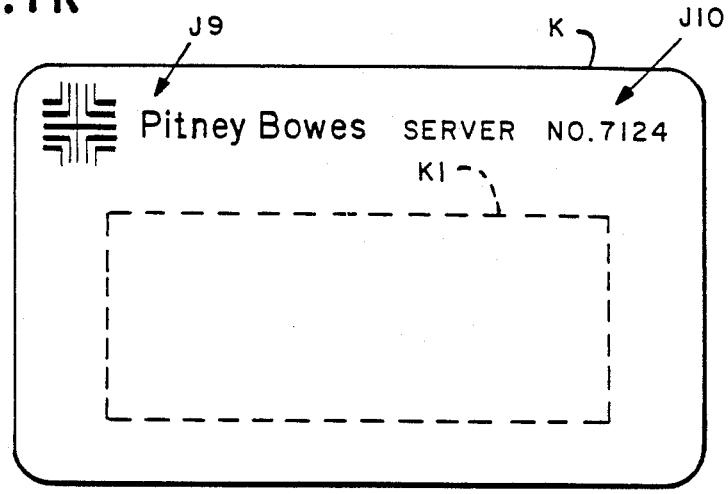
FIG. 1(k) is a front view of a plastic card of the type which may be utilized according to the invention for storing passport data by electro-optical, magnetic or electronic means.
Figure 1L:
FIG. 1(l) is a front view of a printed bond paper sheet, of the type shown in FIG. 1(b), including alphanumeric and graphic information printed according to the invention for preparing a more complex passport than the passport shown in FIG. 1(j)

FIG. 1(k) shows a token K such as a conventional plastic credit-type card, in which there may be stored the accounting data and other information needed for providing the summary of bulk mail accounting information referred to in the discussion of FIGS. 1(f) and 1(l). Thus the token K may be used as another form of passport. To that end, the token K preferably has imbedded therein a suitable electronically, electro-optically or magnetically alterable data storage medium K1. The storage medium K1 may be any type device which is adapted to be programmed by a program writing device into which the token K may be inserted for programming purposes. For the purpose of identifying a given one of such program writing devices with which the token K is to be associated, the token K may include the name of the manufacturer J9 and serial number J10 of the program writing device, which may for example be an appropriately equipped postage dispensing device, with which the token K is to be associated, it being understood that the associated program writing device would be comparably identified.

FIG. 1(l) shows a sheet L, similar to the sheet B shown in FIG. 1(b), which is utilized as a passport of the type shown in FIG. 1(j). The sheet L includes a more complex summary of bulk mailing data than the summary referred to in the discussion of FIG. 1(j). In this connection, the passport shown in FIG. 1(l) may include information corresponding to the matters J1–J12 discussed above and any other informational entries that may be required by a Postal Service Agency, including a certification statement L1 prepared for the signature of the Postal Inspector receiving the passport. A more detailed discussion of the passport shown in FIG. 1(l)

may be found in U.S. application Ser. No. 940,110 filed Dec. 10, 1986 by Ronald P. Sansone for A System And Method Of Processing Multiple Statement Sheets and assignee to the assignee of the present invention. The sheet L exemplifies a typical stationery item which has printed thereon alphanumeric and graphic information for preparing a passport utilizing the apparatus according to the present invention.

With the above thoughts in mind, it is noted that the return envelope G together with the return remittance slip H may be enclosed by a business letter mailer in either of the envelopes E or I. In either instance, when the return document G or H, as the case may be, is returned, the codes G6, H3 and H4 may be detected by appropriate sensors operably associated with computer controlled mailpiece processing apparatus, as more fully discussed in the aforesaid U.S. Pat. No. 4,800,504. Other combinations, sizes and shapes of envelopes A, C, E, G and I, and sheets B, F, H, J and L may be used as stationery items, by persons skilled in the art without departing from the spirit and scope of the invention, including for example window-type envelopes and appropriately printed stationery items for use with window-type envelopes.

Figure 2A:
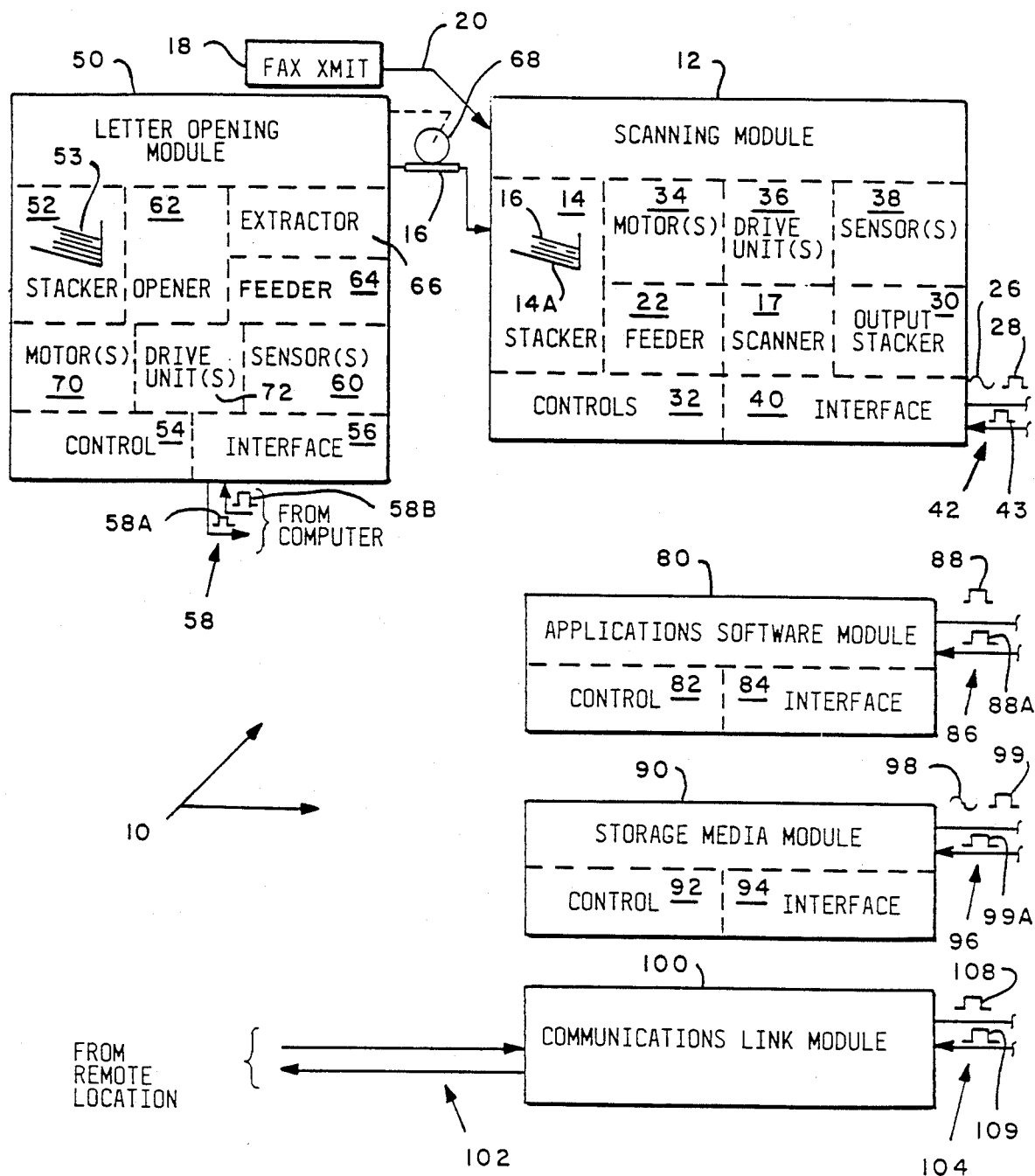
FIG. 2(a) is a schematic view of a plurality of data input modules of the apparatus for processing stationery items according to the invention.

As shown in FIG. 2(a) the apparatus 10 according to the invention generally includes a plurality of data input modules, including one or more scanning modules represented by the scanning module 12.

The scanning module 12 (FIG. 2(a)) may include a stacking structure 14 including a hopper 14A into which there may be loaded one or more sheets 16, which are pre-printed to include alphanumeric or graphic information, or both, which a business mailer wishes to have printed on a stationery item. The scanning module 12 may include any type of document scanning structure 17, including for example an optical character reading (OCR) device. Further, without departing from the spirit and scope of the invention, the module 12 may comprise a conventional facsimile transceiver. The scanning module 12 may therefore be conventionally adapted to receive letter data from a remotely located facsimile transmitter 18 via a conventional telephone line 20. Further, without departing from the spirit and scope of the invention the scanning module 12 may be conventionally adapted to receive sheets 16, one at a time from a conventional letter opening module 50, hereinafter discussed in greater detail, in which instance the scanning module 12 may not be provided with an input stacker 14. In either instance, the scanning module 12 includes conventional sheet feeding and scanning structures, 22 and 17 respectively. The scanning structure 17 detects alphanumeric and graphic information on each sheet 16 as it is fed by the feeding structure 22, in a predetermined path of travel extending past the scanning structure 17, and provides an analog or digital output signal, such as the signals 26 or 28, which are representative of such the information, depending upon the design of the scanning structure 17. The scanning module 12 may also include a conventional output stacker 30 into which the respective sheets 16 are fed by the feeding structure 22 after being scanned. The scanning module 12 is preferably a conventional, stand alone, device which includes a control structure 32, preferably including a microprocessor, for controlling the module 12. In addition, the scanning module 12 includes one or more motors 34 conventionally connected to the stackers, 14 and 30, and feeder 22, directly or via one or more drive units 36. The module 12 additionally includes a plurality of conventional sensing devices 38, some of which are operably coupled to the motors 34, drive units 36 and feeder 22, for sensing various operational positions thereof, including their respective home positions. Another of such sensors 38 is operably located relative to the sheets in the stacking structure 14 for determining whether or not a sheet is available for scanning. And, other sensors 38 are operably located relative to the sheet feed path for sensing the presence or absence of sheets 16 at various positions in the sheet feed path. The motor 34 and drive units 36 and 38 are conventionally coupled to the control structure 32 for operation thereby, and the sensors 38 are suitably coupled to the control structure 32 for providing signals to the control structure 32 which are indicative of the aforesaid conditions and positions of the motors 34, drive units 36, feeder 22 and sheets 16. Further, the scanning module 12 includes a conventional operator interface 40, coupled to the control structure 32 for operation thereof in response to operator input signals. Preferably the control structure 32 includes a two-way serial or parallel communication link 42, via which the respective data and sensor signals 26 or 28, as the case may be, are transmitted to an external source, such as the computer hereinafter described, and via which control signals, such as the signal 43, may be received from the external source. Accordingly, complete control of the operation of the module 12 may be exercised from an external source, such as a computer, rather than from the operator interface 40.

Assuming the provision of a letter opening module 50 (FIG. 2(a)), the module 50 preferably includes conventional stacking structure 52 into which one or more mailpieces 53 may be loaded for processing. Like the scanning module 12, the letter opening module 50 is preferably a conventional stand alone module, which is adapted for external control. To that end, the module 50 includes a suitable control structure 54, preferably including a microprocessor, for controlling the various structures and functions of the module 50 in accordance with input signals received from an operator interface 56 which is conventionally coupled to the control structure 54. Further, the control structure 54 is conventionally constructed and arranged to include a two-way serial or parallel communication link 58, via which respective data signals, such as the signal 58A may be transmitted to an external source such as the computer hereinafter described, and via which control signals, such as the signal 58B, may be received from the external source. Accordingly, complete control of the module 50 may be exercised from an external source communicating therewith via the channel 58. The module 50 includes a plurality of sensors 60 which are conventionally coupled to the control structure 54. At least one of such sensors 60 is conventionally associated with the mailpiece stacking structure 52 for determining whether or not a mailpiece 53 is available for processing. The module 50 additionally includes suitable mailpiece opening structure 62, and includes conventional sheet feeding structure 64 for feeding respective mailpieces 53 from the stacking structure 52 to the mailpiece opening structure 62. In addition, the module 50 includes conventional structure 66, for extracting the contents of opened mailpieces 53. And the feeding structure 66 includes suitable means, including for example a roller 68, for feeding extracted contents, such as a sheet 16, from the letter opening module 50. In addition, the module 50 includes one or more motors 70, which are conventionally connected to the stacker 52, opener 62, extractor 66 and feeder 64, either directly or via one or more drive units 72 driven by the motors 70. For sensing various positions of the motor 70, drive units 72 or both, including their respective home positions, and for sensing respective positions of the mailpieces contents in their path of travel, a multiplicity of the sensors 60 are operatively associated on a one-for-one basis with the respective motors 70 and drive units 72, and with the feed path of the mailpiece contents, for sensing such positions. The sensors 60 are suitably coupled to the control structure 54 for providing data signals representative of such positions to the control structure 54, and the control structure 54 is conventionally constructed and arranged for operating the motors 70, and drive units 72 for controlling the feeder 64, opener 62 and extractor 66 in accordance with operator input signals from the interface 56 or from the external source communicating with the module 50 via the communication link 58.

The apparatus 10 (FIG. 2(a)) may additionally include one or more applications software carrying modules, represented by the module 80, one or more storage media modules, represented by the module 90, and one or more communications link modules, represented by the module 100. Each of the applications software modules 80 is a conventional device, such as a tape, disk or word processor, and may include control structure 82, preferably including a microprocessor. The control structure 82 is constructed and arranged for controlling the various structures and functions of module 80 in accordance with input data received from an operator interface 84 which preferably includes a keyboard. The interface 84 is suitably coupled to the control structure 82 for operating the module 80. Further the control structure 82 includes a conventional two-way parallel or serial communications link 86. The control structure 82 provides digitized signals, such as the signal 88, to the external source which correspond to letter data information provided by software or correspond to operation of the module 80. In addition the control structure 82 receives control signals, such as the signal 88A from the external source. Accordingly, the control structure 82 is constructed and arranged to permit the exercise of complete control of the structures and functions of the applications software module 80 from the external source, rather than from the operator interface 84. Similarly, each of the storage media modules 90 is a conventional device such as a tape or disk drive unit, which includes control structure 92, and an operator interface 94 coupled to the control structure 92 for controlling the module 90. Further, the control structure 92, is constructed and arranged to permit control of the various structures and functions of the module from an external source, via a conventional two-way serial or parallel communications link 96. To that end, the control structure provides analog or digital letter data signals, such as the signals 98 or 99, corresponding to letter data information stored in the storage media or corresponding to operation of the module 90, to the external source. And, the external source provides control signals such as the signal 99A to the control structure 92. Accordingly, complete control over the functions of the module 90 may be exercised from external source via the communications link 96, or from the operator interface 94. The communications link module 100, may be any conventional device, such as a modem or microcomputer programmed for receiving letter data communications from a remote source via a conventional two-way serial or parallel communications link 102. The module 100 also includes a conventional two-way serial or parallel communications link 104 for transmitting digitized letter data signals such as the signal 108, to an external source, and receiving control signals, such as the signal 109, from the external source, whereby the external source may exercise complete control of the module 100 via the two-way communications link 104.

According to the invention, each of the data input modules 12, 50, 80, 90 and 100, is thus constructed and arranged to be interfaced with an external source, via a conventional, two-way, communication link, such as the links 42, 58, 86, 96 and 104 respectively. According to the invention, the external source is a computer such as the computer 120 (FIG. 2(b)). The computer 120 may be any commercially available computer having a sufficient number of serial or parallel communication interface and other ports, 121, which are programmable for serial or parallel communications purposes to provide a separate two-way link with each of the aforesaid modules 12, 50, 80, 90 and 100.

Figure 2B:
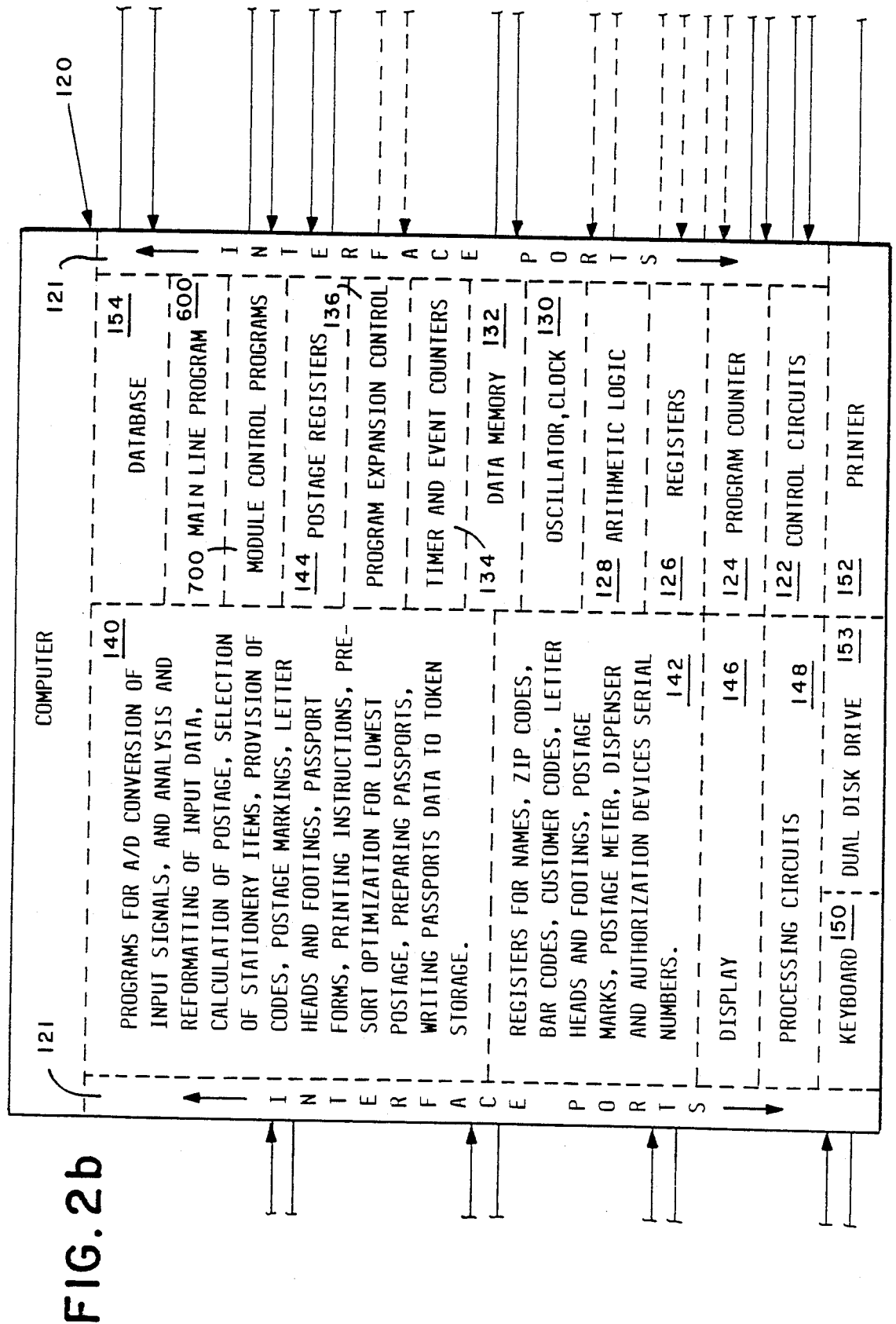
FIG. 2(b) is a schematic view of a system computer adapted for use in the apparatus according to the invention.

The computer 120 (FIG. 2(b)) generally includes a plurality of discrete circuits including those for a plurality of central processing units, each of which includes control circuits 122, program counter 124, a plurality of registers 126 and an arithmetic logic unit 128, and those for one or more oscillators and clocks 130, data memories 132, timer and event counters 134, and program expansion control 136. In addition the computer 120 includes respective programs 140 for the analysis of analog and digital letter data input signals, received from the respective input modules 12, 50, 80, 90 and 100, and for reformatting and supplementing the data corresponding to such signals. Thus the computer 120 provides reformatted letter data for preparing letters in which alphanumeric or graphic information, or both, corresponding to the letter data that is received and supplementary data which is provided by the computer 120, is printed on respective stationery items to provide letters and passports in predetermined formats. To that end, the computer 120 includes conventional analog to digital converter circuits for providing digital letter data corresponding to analog letter data signals 26 or 98 (FIGS. 2(a) and 2(b)) upon receiving such signals 26 or 98. In addition, the computer 120 is programmed for the analysis of the letter data signals 26, 28, 58A, 88, 98, 99 and 108, as thus converted to or received as digital data signals from the various modules 12, 50, 80, 90 and 100, and reformatting such data as needed to conform the same to letter data corresponding to one or more predetermined letter formats. The reformatting program thus provides for identifying such parts of the input data which correspond to the message part of any given letter, including each of the respective paragraph parts of the message. In addition the reformatting program provides for identifying the addressor and addressee parts of the input letter data, and the name, location and zip code parts of their respective addresses. Further, the reformatting program provides for identifying the application parts of the letter data, including for example the "Dear Sir" or corresponding part, and the "Regards", "Very truly yours", "Sincerely", or other corresponding part, and the signature part, including any graphic signature part, associated name part, title part, telephone number part, location code part, or the like. Further, the reformatting program provides for identifying the "enclosure" or "attachments" parts or the like. In addition the reformatting program 140 provides instructions suitable for selecting each identified part of the letter data, and stationery item on which the alphanumeric or graphic information corresponding to the data parts as thus identified, is to be printed. Further, the program 140 establishes the font size(s), margin dimensions and line spacings of the letter to be printed. Further, the computer may include one or more programs for causing data corresponding to one or more codes, including a sort code, bar code or customer identification code, stored in registers 142 and cross-referenced with the identified zip code or name, as the case may be, to be copied from such registers 142 and included or associated with the letter data for printing alphanumeric information corresponding to the stored data 142 on one or more of selected stationery items on which the information corresponding to any part of the letter data is to be printed. Further, the computer 120 may include one or more programs 140 for causing data corresponding one or more business letter heads or footings, or both, including data corresponding to the alphanumeric and graphic information normally found on an envelope or first or subsequent pages of a formal business letter, as shown in FIGS. 1(c), 1(d), 1(e) and 1(i), and stored in registers 142 and cross-referenced with one or more identified names or codes, to be copied from such registers 142 and included or associated with the letter data for printing alphanumeric or graphic information corresponding thereto on one or more of selected stationery items on which the information corresponding to any part of the letter data is to be printed.

Still further the computer 120 may include one or more programs for providing, either by means of calculating the same or utilizing a look-up table therefor, the postage value required for mailing the number of stationery items to be selected for the preparation of any given letter, based upon the font size(s), margin dimensions and line spacing of the letter to be printed and the number and weight of the stationery items to be selected for printing the letter, at any time after reformatting has been completed, for example, prior in time to the selection of such stationery items. Further, the computer 120 may include one or more programs for causing data corresponding to one or more postage markings, such as the indicia shown in FIGS. 1(e) at E5, 1(g) at G5 and FIG. 1(i) at I7, or the provided postage value itself, or both, to be copied from appropriate registers 142 of the computer 120 in which such data is stored and included or associated with the letter data, for printing alphanumeric or graphic information corresponding thereto on one or more of selected stationery items on which other information is to be printed.

In addition, the computer 120 may include one or more programs for accounting for and causing data corresponding to a given transaction number, as hereinbefore discussed in connection with FIG. 1(j), or data identifying the serial number of any postage metering, dispensing, printing or authorization apparatus discussed in this application, or data corresponding to a count of the number of mailpieces included in any run or batch, and the run, batch number, class of mail of any run or batch, postage costs of individual mailpieces, total postage costs of the mailpieces included in any run or batch of mailpieces, and any and all other accounting information, or graphic or textual materials, shown in FIG. 1(l), to be generated, looked up or calculated, or copied from registers 142 in which such data is stored, for printing alphanumeric information corresponding thereto on one or more of the selected stationery items on which such information is to be printed, or for storing such data by conventional means, such as by mechanical, optical, electro-optical, magnetic or electronic means, in any storage media K1 of any token K removably connected to the computer 120.

Further, the computer 120 may be programmed for generating data corresponding to the date, place and time of preparing any one or more stationery items, and including or associating such data with any other data for printing alphanumeric information corresponding thereto on one or more selected stationery items on which such information is to be printed or for storing such data in the storage media K1 of any token K.

Further, the computer 120 may include one or more programs for reading data corresponding to a postage amount from any token, or causing any module connected to the computer 120 to mechanically, electro-optically, magnetically, optically or electronically perform the reading function, and either adding or subtracting the amount represented by the postage amount to or from the postage available or postage used registers 144 of the computer 120 or of any module having a postage available data storage medium and communicating directly or indirectly with the computer 120.

In addition to the foregoing, the computer 120 includes a conventional local terminal, having a display 146 processing circuits 148, keyboard 150, printer 152 and dual disk drive 153. Without departing from the spirit and scope of the invention, the processing circuits 148 may include, in a given physical application of the apparatus according to the invention, all of the structure, programming, data storage and circuitry hereinbefore discussed and numbered 122, 124, 126, 128, 130, 132, 134, 136, 140, 142, and 154, and the programming designated 600 and 700. In a given embodiment of the invention, the storage capacity of the computer registers 126 may be sufficient to store letter data corresponding to, for example, one thousand or more separate letters, each of which includes a data part corresponding to the postal zip code of the addressee of the letter. And, the computer may be programmed in response to operator entry form the keyboard 150, to cause the registers 126 to be accessed for identifying and storing in other registers 126 the letter data corresponding to all letters which include a particular initial three digits in their respective postal Zip codes. Accordingly, the computer 120 is preferably programmed to identify a plurality of predetermined postal zip code elements which are included in each of a plurality of postal zip codes. Further, the computer 120 may be programmed in response to operator input from the keyboard 150 to cause the computer to identify the letter data corresponding to each of such letters having the zip codes including the same three digits. Accordingly, the computer is preferably programmed for pre-sorting letter data to permit letters corresponding thereto to be printed as a pre-sorted series of letters.

The computer 120 also preferably includes a data base 154 in which there may be stored accounting information which is updated from time to time as the computer 120 is utilized for operating the modules of the apparatus according to the invention to permit the accumulation of relevant information concerning any and all aspects of such operation. Further, the data base 154 may be accessed from the keyboard for retrieving any part of the data base 154 for display and printing.

For providing the stationery item, on which the information corresponding to selected parts of the letter data hereinbefore discussed and information corresponding to data provided by the computer 120 (FIG. 2(b)), may be printed, the apparatus 10 (FIG. 2(c)) also includes one or more stationery items feeding modules represented by the module 160. The feeding module 160 is preferably a conventional, stand alone device which includes suitable control structure 162, including a microprocessor, for controlling the various structures and functions of the module 160. In addition, the module 160 includes an operator interface 164, including a keyboard, which is conventionally coupled to the control structure 162 for operation thereof in response to operator input from the interface 164. The control structure 162 is also conventionally adapted to include a two-way serial or parallel communication link 165 for conventionally coupling the control structure 162 to an external source, exemplified by the computer 120, to provide data signals, such as the signal 166A to the computer 120 and for operation of the control structure 162 in response to control signals, such as the signal 166B, from the computer 120. Thus the module 160 is adapted to permit complete control of its structure and functions from an external source rather than from the operator interface 164. The module 160 additionally includes a plurality of sheet feeding structures designated 170, 175 and 180, which are respectively denominated the "first item" "other item" and "last item" feeders to denote that any number of such feeders 170, 175 or 180 may be included to accommodate the selection and feeding of different stationery items 161 from the module 160. The feeding structure 170, includes stacking structure 172 for accommodating a plurality of like stationery items 161, which may be a plurality of blank or partially blank stationery items 161 such as those shown in FIGS. 1(b), 1(d), 1(j) or 1(l), or any different size, shape or variation thereof. Similarly, the feeding structure 175, includes stacking structure 176 for accommodating a plurality of like stationery items 161, which may be blank or partially blank stationery items 161 such as those shown in FIGS. 1(a), 1(c), 1(g), 1(h), 1(i), 1(j) or 1(l), or any different size, shape or variation thereof. And the feeding structure 180, includes stacking structure 182 for accommodating a plurality of like stationery items 161, which may be blank or partially blank stationery items 161, such as those in FIGS. 1(a), 1(c), 1(i), 1(j) or 1(l), or any different size, shape or variation thereof. The stationery items 161 are manually loaded into the respective stacking structures 172, 176 and 182 and fed therefrom one at a time. To that end, the module 160 includes conventional feeding structure represented by the feeding structure 185, which includes conventional means for feeding the respective stationery items 161 in a predetermined feed path through the module 160, and may include suitable structure, such as the roller 186 for feeding such stationery items 161 from the module 160. The feeding module 160 additionally includes one or more motors 190 coupled to the control structure 162 and to the respective feeding structures 170, 175, 180 and 185, either directly or indirectly via one or more drive units 192. In addition, the feeding module 160 includes a plurality of sensors 194. Some of the sensors 194 are operably located for sensing stationery items 161 in the various feeding structures 170, 175, 180 and 185, and determining whether or not respective stationery items 161 are available for printing. Other sensors 194 are operably located with respect to the stationery items feed path, for sensing the presense or absence of stationery items 161 in the feeding structures 170, 175, 180 and 185 and at various relevant positions in the feed path, and providing conventional input signals to the control structure 162 which are indicative of such conditions and positions. And, the remainder of such sensors 194 are operatively coupled with suitable elements of the motors 190 and drive units 192 for sensing various positions of the motors 190 and drive units 192, including their respective home positions, and providing conventional input signals to the control structure 162 which are indicative of such positions. Further, the control structure 162 is adapted to provide data signals, such as the signal 166A, corresponding to the aforesaid conditions and positions to the operator interface 164 and to the communication link 165 to facilitate operation of the module 160 from the interface 164 or from an external source, such as the computer 120 via the communications link 165.

Figure 2D:
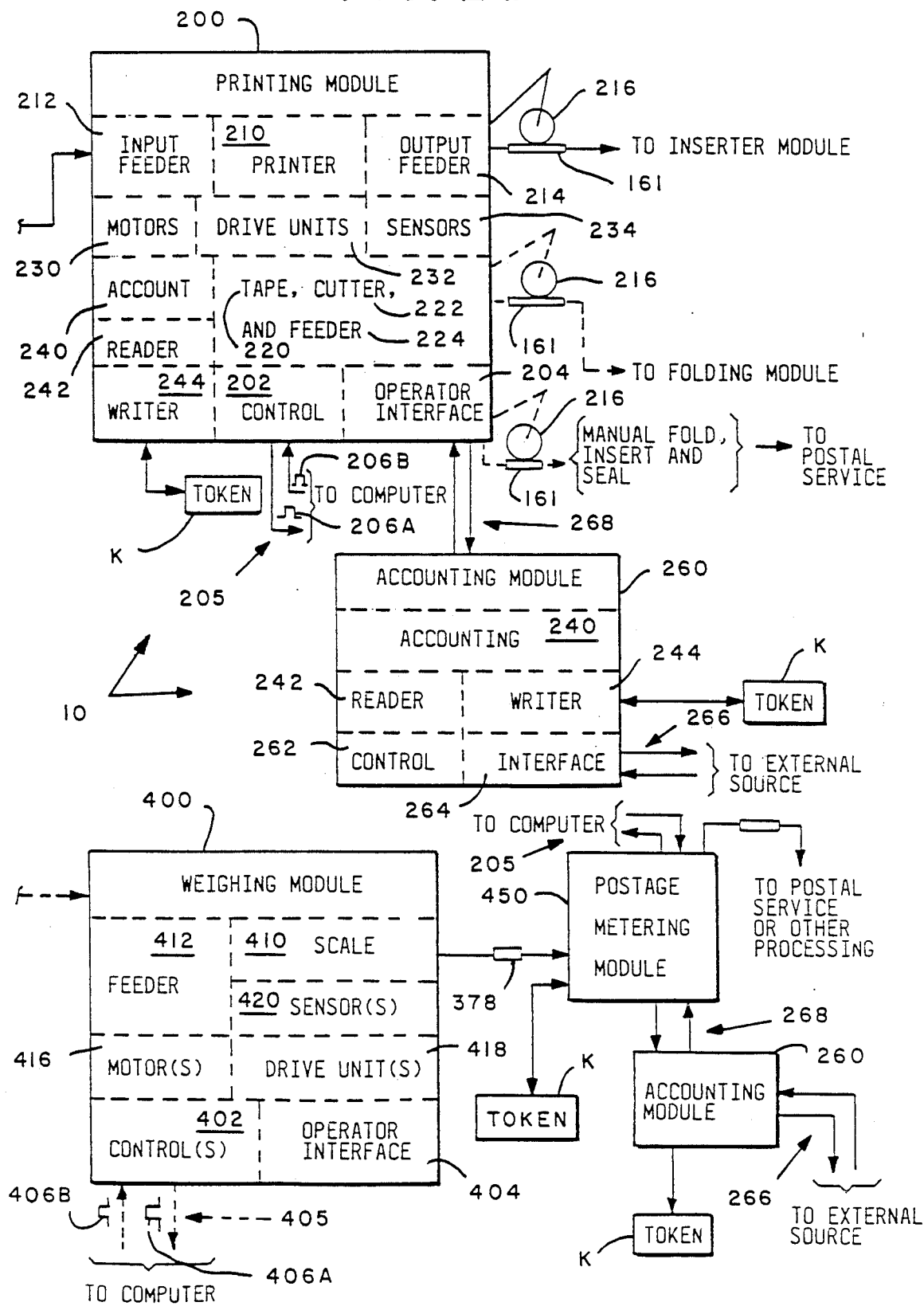
FIG. 2(d) is a schematic view of a plurality of additional modules adapted to be controlled by the computer of FIG. 2(a) for processing stationery items in accordance with the invention.

For printing the various parts of information selected by the computer 120 (FIG. 2(b)) on the selected stationery items 161 fed from the module 160, the apparatus 10 also includes one or more printing modules represented by the module 200 (FIG. 2(d)). The printing module 200 is preferably a conventional stand alone device which includes suitable control structure 202 for controlling the various structures and functions of the module 200. In addition, the module 200 includes an operator interface 204, which is conventionally coupled to the control structure 202 for operation thereof in response to operator input signals from the interface 204. The control structure 202 is also conventionally adapted to include a two-way serial or parallel communication link 205 for conventionally coupling the control structure 202 to an external source, exemplified by the computer 120, to provide data signals, such as the signal 206A to the computer 120, and for operation of the control structure 202 in response to control signals, such as the signal 206B, from the computer 120. Thus the module 200 is adapted to permit complete control of the structures and functions of the module 200 from an external source rather than from the operator interface 204. The module 200 additionally includes conventional printing structure 210, and conventional input feeding structure 212 for feeding stationery items 161, received one at a time from the feeding module 160, in a predetermined path of travel through the printing structure 210 as the printing structure 210 prints selected parts of information on the respectively selected stationery items 161. Without departing from the spirit and scope of the invention, such parts may include a pre-sort identification mark of the type required by the U.S. Postal Service for marking pre-sorted letters. In addition, the printing module 200 includes conventional output feeding structure 214, including for example a roller 216, for feeding printed stationery items 161 from the module 200. The printing module 200 may additionally include a conventional tape feeding system, including a suitable source of supply of tape 220, a tape cutter 222 and tape feeder 224, for feeding discrete lengths of the tape 220 to the printing structure 210 for printing thereon selected postage markings, alone or in combination with other information, or parcel registration information. Thus the printing module 200 may be utilized for either mail or parcel marking purposes, it being understood that the tape 220 is of a type which is conventionally adapted to be secured to either mailpieces or parcels. The printing module 200 additionally includes one or more motors 230 coupled to the control structure 202 and to the respective feeding structures 212, 214, 224 and cutter 222, either directly or indirectly via one or more drive units 232. In addition, the printing module 200 includes a plurality of sensors 234. Some of the sensors 234 are operatively associated with the feeding structures 212, 214 and 224, cutter 222, printing structure 210 and stationery items feed path, for sensing the presence or absence of stationery items at the printing structure 210, and feeding structures 212 and 214, and the presence or absence of tape 220 at the feeding structure 224 and cutter 222, and for sensing various relevant positions of the stationery items 161 and tape 220 in the feed path through the module 200, and providing conventional data signals to the control structure 202 which are indicative of such conditions and positions. And, the remainder of such sensors 234 are operatively coupled with suitable elements of the feeding structure 212, 214 and 224, the cutter 222, motors 230 and drive units 232, for sensing relevant positions thereof including their respective home positions, and providing conventional data signals to the control structure 202 which are indicative of such positions. The printing module 200 may optionally include accounting structure 240, for example of the type utilized in a conventional electronic postage meter, for electro-optically, magnetically or electronically storing data relating to available or used postage, or both, postage or the passport information hereinbefore discussed. Further, the module 200 may include reading and writing structures, numbered 242 and 244 respectively, coupled to the accounting structure 240. The reading and writing structures, 242 and 244, may be of the type conventionally utilized in card controlled devices and include conventional circuits controlled by the control structure 202 for transferring or copying stored data to and from the accounting structure 240 and the storage media of a token, such as the storage media K1 of the token K shown in FIG. 1(k), it being understood that the structures 242 and 244, includes a comparable electro-optical, magnetic or electronic storage media for such data. In addition, the accounting structure 240 includes conventional logic circuits for decrementing the postage available for printing in the accounting structure 240 by respective increments corresponding to the postage printed by the printing structure 210, or either incrementing or decrementing the postage available for printing by respective increments corresponding to those read from a token K1 in accordance with instructions stored in the token K1. For passport data storage purposes, the accounting structure 240 may also have stored therein a serial number assigned by a postage meter manufacturer, and data corresponding to the data hereinbefore discussed in connection with the discussion of the programs and registers of the computer 120 for providing any and all information that may be included in a passport, whereby such data may be written into the storage media K1 of a token K which may then be used as a passport. Further, the accounting, reading and writing structures 240, 242 and 244 are conventionally coupled to the control structure 202, which is adapted to provide data corresponding to the data stored in the accounting structure 240, and processed by the reading and writing structures 242 and 244, and data corresponding to the conditions and positions sensed by the sensors 234, to the operator interface 204 and communications link 205, to facilitate operation of the module 200 from the interface 204 or from the computer 120 via the communications link 205. According to the invention, the printing structure 210 may be any conventional mechanical printing structure, including but not limited to a dot matrix printer, such as a pin printer, or other impact-type or pressure type printing structure. Alternatively, the printing structure 210 may be any other type of printing structure, including but not limited to any electrophotographic, ink jet or thermal printing structure. Thus the printing structure 210 may include a laser, light emitting diode (LED) or other electrostatic printing structure, or ink jet, thermal ink transfer, or rotary printing structure, or the like, and include other conventional structures normally associated with such printing structures, coupled to and controlled by the control structure 202. Further, without departing from the spirit and scope of the invention, the ink utilized by such printing structures may include a fluorescent pigment.

As an alternative to providing the printing module 200 with the aforesaid accounting, reading and writing structures 240, 242 and 244, a separate accounting module 260 may be provided which includes such structures 240, 242 and 244, and, in addition, control structure 262 coupled thereto and to an operator interface 264. Assuming the provision of the accounting module 260, a token K which is removably connectable to the reading and writing structures 242 and 244 may be utilized in the same manner and for the same purposes hereinbefore discussed in connection with the discussion of the printing module 200. In addition, the accounting module 260 is preferably provided with a two-way communication link 266 for interfacing the module 260 with an external device, preferably the computer 120, for operation of the module 260 from the computer 120 rather than from the operator interface 264. On the other hand the control structure 262 is also preferably provided with a conventional two-way serial or parallel communications link 268 for interfacing the control structures 262 and 202 with each other, to permit the operator of the printing module 200 to control operation of the accounting module 260 from the operator interface 204 and to permit the computer 120 to control operation of the accounting module via the printing module control structure 202. Further, the two way communication link 266 may be connected via a conventional telephone link to a privately controlled mailing center such as a Manifest Mail Reporting System (MMRS) center of the type established by Pitney Bowes Inc., for electronically incrementing the postage available amount, which is stored in the accounting structure 240 as hereinbefore discussed in connection with the discussion of the printing module 260.

The printed stationery items 161 fed from the printing module 200 (FIG. 2(d)), may be differently processed, depending upon the availability of processing apparatus, postal service regulations and mailing practices of business mailers. According to the invention, the computer 120 is programmed for calculating the lowest possible postage for mail which includes a zip code having the same first three digits, for processing bulk mailing of pre-sorted mail. In addition, the computer 120 is programmed for processing bulk mailings of permit and manifest mail. According to the invention, in order to permit business mailers to deliver such bulk mailings to the Postal Service both during and outside of the normal business hours of the Postal Service, such bulk mailings are preferably deposited in a distinctively marked, and therefore easily recognizable, mailpouch which is distinguishable from all other mailpieces received by the Postal Service in the general mailstream so that it may be extracted from the general mailstream for special handling, in this instance inspection, just as awkwardly shaped mailpieces such as film bags are extracted from the general mailstream for special handling.

As shown in FIG. 2(d) the printed stationery items 161 fed from the printing module 200, may be fed to an inserter module or folding module, or collected for manual insertion purposes. Assuming manual insertion, a system of the type hereinbefore discussed may include, as shown in FIG. 3, a conventional personal computer 120, including a display 146, keyboard 150 and processor 148, and a dual disk drive 153 into which an applications program software disk 80 may be inserted for programming the computer 120 as hereinbefore discussed in connection with the discussion of the computer 120. In addition, there is shown a modularly constructed stationery items feeder 160, which comprises a conventional three bin sheet feeder, including stackers 172, 176 and 182, into which there has been loaded a plurality of stationery items 161, including first and second letter headed sheets and letter headed envelopes. A commercially available laser printer, which includes scanning and printing modules 12 and 20 of the type hereinbefore discussed, includes a hopper 17 into which a plurality of sheets 16 have been loaded. The sheet feeder 160 is mounted on top of the laser printer, 12, 20, and is conventionally mechanically and electronically coupled to the laser printer. The computer 120 is connected to the laser printer 12, 20, and sheet feeder 160 via the communication link 42, 205 for controlling the laser printer and sheet feeder. According to the invention, a plurality of distinctively marked, such as by means of a colored band 270A, and therefore, easily recognizable bags or other pouches 270 are provided, for example by removably affixing the pouches 270 to the laser printer. One of such pouches 270B, which is numbered 270A, has been shown removed and opened for discussion purposes. Each of the pouches 270 includes a pocket 272 into which a passport, such as one of the passports hereinbefore discussed, may be deposited. As shown in FIG. 3, under the control of the computer 120, sheets 16 are fed from the hopper to the scanner 12 of the laser printer 200. Whereupon the sheets 16 are scanned as hereinbefore discussed in the discussion of the scanning module 12, and the computer 120 causes data corresponding to selected parts of the information to be included on the sheets 16 to be reformatted for printing on selected stationery items fed from the stackers 172, 176 and 182. In addition, the computer 120 causes supplementary data, including data corresponding to the line of information shown at I3 in FIG. 1(i), to be provided and printed on selected stationery items fed from the stackers 172, 176 and 182. As the printed sheets 161 are fed from the feeder 160, the first and second sheets are manually folded and inserted into the envelope, which may be an envelope of the type shown in FIG. 1(i), as a result of which the MMRS line of printed information I3 is printed on the envelope. At the end of a run or batch of letters being printed by the laser printer, the bag 270B may be conventionally sealed, and the computer 120, directed by operator input from the keyboard, instructed to print a passport L, by causing a sheet from the first sheet feeder to be fed to the laser printer 200, and then causing the printer to print the passport L. The passport L is then inserted into the pocket 272 of the pouch 270A. Alternatively the computer 120 may be comparably directed to write the passport data into the storage media of a token K removably inserted into reading and writing structure 242, 244 of the type hereinbefore discussed, which is coupled to the computer 120 as hereinafter discussed. Whereupon the token K, which has the passport data written into the same, may be inserted into the pocket 272. In either instance, the pouch 270B with either the printed or stored passport information deposited in its pocket 272 may then be hand delivered to the Postal Service for further processing.

The processing portrayed in FIG. 3 exemplifies the utilization of apparatus 10 according to the invention for small bulk mailings of permit, pre-sorted and other manifested mail, and the passport referred to is exemplary of each type of passport to be included with the permit, pre-sort or manifest mail for providing the information respecting such bulk mailings as is required by the Postal Service for large bulk mailings of manifested mail, or such other accounting data as may be required by the Postal Service for small bulk mailings of permit, pre-sorted or manifested mail. Preferably, each type of such manifested mail is deposited in a differently marked and therefore separately, easily recognizable, distinctive bag, or other bulk mail mailpouch, to allow for diversion of such different mailpouches to different postal inspection stations or for other purposes, depending upon the needs of the Postal Agency to which such mailpouches are delivered. Utilizing the system described, both small and large business mailers alike may mail small bulk mailings of permit, pre-sorted and other manifested mail, both during and outside of the normal business hours of the Postal Service for pick up by the Postal Service, inasmuch as each of such distinctively marked mailpouches may be easily recognized for extraction from the general mailstream and includes in the passport provided therewith all of the accounting information needed by the Postal Service for processing such bulk mailings without requiring the personal appearance of a representative of the mailer of the bulk mailing. In this connection, it is noted that in order to facilitate the aforesaid procedures the passport may include the bulk mailer's deposit account serial number as maintained by the Postal Service, to permit the Postal Service to debit the bulk mailer's account upon inspecting the bulk mailing.

Referring again to FIG. 2(d), as hereinbefore discussed, the stationery items 161 fed from the stationery items module 160 and processed by the printing module 200 may be envelopes such as the envelopes shown in FIGS. 1(a), 1(c), 1(e), 1(g) or 1(i). However, rather than feeding envelopes for a given run of letters, the message parts of respective letters may be printed on one or more stationery items, such as those shown in FIGS. 1(b), 1(d), or 1(f) and each of such letters may include a second one of such stationery items 161 utilized as a mailing cover sheet. As thus arranged the cover sheets would include the information printed on the envelopes shown in FIGS. 1(e) or 1(j) for preparing selfmailing-types of letters. With these thoughts in mind, the apparatus 10 according to the invention may include one or more folding modules, such as the folding module 300 (FIG. 2(c), to which printed stationery items 161 are fed, one at a time from the printing module 200. The folding module 300 is preferably a conventional stand alone device which includes suitable control structure 302 for controlling the various structures and functions of the module 300. In addition, the module 300 includes an operator interface 304, which is conventionally coupled to the control structure 302 for operation thereof in response to operator input signals from the interface 304. The control structure 304 is also conventionally adapted to include a two-way serial or parallel communication link 305 for conventionally coupling the control structure 305 to an external source, exemplified by the computer 120, to provide data signals, such as the signal 306A, to the computer 120, and for operation of the control structure 302 in response to control signals, such as the signal 306B, from the computer 120. Thus the module 300 is adapted to permit complete control of the structures and functions of the module 300 from an external source rather than from the operator interface 304. The module 300 additionally includes conventional folding structure 310, and accumulating stacking structure 312 which includes a bin 314 which the successive printed stationery items 161 for a given letter are fed one after the other and accumulate on top of the other for collation thereof. In addition, the folding module 300 includes conventional input feeding structure 316, which includes conventional structure for grasping the collated stationery items 161 in the bin 314 and feeding the same in a predetermined path of travel through the folding structure 310 which folds the collated stationery items 161. In addition, the folding module 300 includes conventional sealing structure 318, such as a stapler or other device for sealing the folded stationery items 161 fed therethrough by the feeding structure 314. Further, the folding module 300 includes conventional output feeding structure 320, including for example a roller 322, for feeding the collated, folded and sealed stationery items 161 from the module 300. The folding module 300 additionally includes one or more motors 330 coupled to the control structure 302 and to the respective feeding structures, 316 and 320, and to the sealing structure 318, either directly or indirectly via one or more drive units 332. In addition, the folding module 300 includes a plurality of sensors 334. At least one of the sensors 334 is operatively associated with the stationery items 161 received in the bin 314 for indicating the presence or absence of sheets in the bin and the reception of all of the stationery items 161 that are to be included in a collation for the given letter being processed in the folding module 300. In addition, some of the sensors 334 are operatively associated with the feeding structures 316 and 320, and sealing structure 318, and with the stationery items feed path, for sensing the presence or absence of stationery items at the feeding structures, 316 and 320, and sealing structure 332 and for sensing various relevant positions of the stationery items 161 as they are being fed in the feed path through the module 300, and providing conventional input signals to the control structure 302 which are indicative of such conditions and positions. And, the remainder of such sensors 334 are operatively coupled with suitable elements of the motors 330 and drive units 332, for sensing relevant positions thereof including their respective home positions, and providing conventional input signals to the control structure 302 which are indicative of such positions.

Upon completion of processing by the folding module 300, the folded and sealed stationery items 161 may be handled in the same fashion as stationery items 161 processed by the printing module 200 as discussed in connection with the discussion of FIG. 3, but without performing the manual processing steps of folding and inserting the stationery items 161 into a printed envelope. Rather, the collated, folded and sealed stationery items 161 fed from the folding module 300 may be fed by the module's output feeding structure 320 directly into a distinctively marked mailpouch such as the bag 270B shown in FIG. 3. Further, either a printed or token type of passport K or L, as the discussed in the discussion of FIG. 3, may be inserted into the pocket 272 of the bag 270B, and the bag 270B sealed and delivered to the Postal Service.

Referring again to the printing module 200 (FIG. 2(d)), and assuming the stationery items 161 from the printing module 200 are to be automatically processed by inserter structure, such stationery items 11, including one or more sheets and an envelope, are fed one at a time to an inserting module such as the inserting module 350. The inserting module 350 is preferably a conventional stand alone device which includes suitable control structure 352 for controlling the various structures and functions of the module 350. In addition, the module 350 includes an operator interface 354, which is conventionally coupled to the control structure 352 for operation thereof in response to operator input signals from the interface 354. The control structure 352 is also conventionally adapted to include a two-way serial or parallel communication link 355, for conventionally coupling the control structure 352 to an external source, exemplified by the computer 120, for transmitting data signals, such as the signal 356A, to the external source, and for operation of the control structure 352 in response to control signals, such as the signal 356B, from the computer 120. Thus the module 350 is adapted to permit complete control of its structures and functions from an external source, such as the computer 120, rather than from the operator interface 354. The module 350 additionally includes one or more conventionally insert feeding structures 361, and conventional input feeding structure 362, for feeding each of the stationery items 161 received from the printing module into the inserting module 350. Inasmuch as the computer 120 reformats respective letters prior to causing the stationery items feeding module 160 to feed any given stationery item which is to be utilized for printing the reformatted letters the computer 120 is preferably programmed to cause the envelope, if any, of a given letter to be the first stationery item 161 fed from the feeding module 160, followed feeding by the last, next to last, third from last, and so on, and then the first stationery item 161. As a result of which the printing module 200 prints the respective appropriate parts of the given letter on the selected stationery items in the sequence received. Accordingly, the first stationery item received by the inserting module 350 is preferably the envelope of a given letter. The stationery items 161 for the given letter, except the cover envelope into which the rest of the stationery items are to be inserted, are fed in a predetermined path of travel, to the module's accumulating structure 364 where they are stacked in collated form. The inserting module 350 includes inserting structure 366 which may include any suitable structure for opening the cover envelope to permit the insertion of folded stationery items 161 and inserts thereinto. Preferably, the letter's cover envelope is fed to the inserting structure 366 by the feeding structure 362 in the aforesaid path of travel, under the control of the computer 120, prior in time to feeding the rest of the letter's stationery items 161 to the module's accumulating structure 364. In addition, it is preferable that the inserting module 350, under the control of the computer 120, be caused to feed the inserts from one or more of the insert feeders 360 to the accumulating structure 364, after the cover envelope is fed to the inserting structure 366 and before the rest of the stationery items 161 are fed to the accumulating structure 364, to facilitate collation of the contents of accumulator, and, therefore of the cover envelope. In addition, the printing module 200, under the control of the computer 120, is preferably caused to print any and all information required for mailing the given letter, including the postage that will be needed for mailing the letter with the rest of the stationery items 161 and any inserts that are to be provided by the inserting module 350. Thus, before any stationery items 161 for a given letter have been fed from the printing module 200, or any inserts for the given letter have been either selected or fed by the inserting module 350, the postage for mailing the same is provided and printed on the cover envelope. The inserting module 350 additionally includes conventional folding structure 368, and sealing structure 370 which may include suitable apparatus for moistening the flap of the cover envelope and urging the flap into engagement with the body of the cover envelope. In addition, the inserting module 350 includes conventional output feeding structure 372 for grasping the stationery items 161 and inserts in the accumulating structure 364, and feeding the same through the folding structure 368 and to the inserting structure 366, where the folded stationery items 161 and inserts are inserted into the opened cover envelope. In addition, the output feeding structure 372 includes suitable means for feeding the stuffed and sealed envelope 376 from the inserting module 350, including for example the roller 378. The inserting module 350 additionally includes one or more motors 380 coupled to the control structure 352 and to the respective feeding structures 361, 362 and 372, and to the respective inserting and sealing structures 366 and 370, either directly or indirectly via one or more drive units 382. In addition, the inserting module 350 includes a plurality of sensors 386. Some of the sensors 386 are operatively associated with the feeding structures 361, 362 and 372, and the respective accumulating, folding, inserting and sealing structures 364, 368, 366 and 370, for sensing the presence or absence of stationery items 161, inserts and envelopes in such structures 360, 362, 372, 364, 368, 366 and 370, and sensing their various relevant positions in the feed paths through the module 350, and providing conventional data signals to the control structure 352 which are indicative of such conditions and positions. And, the remainder of such sensors 386 are operatively coupled with suitable elements of such structure 360, 362, 372, 364, 368, 366, and 370 and the motors 380 and drive units 382, for sensing relevant positions thereof including their respective home positions, and providing conventional input signals to the control structure 352 which are indicative of such positions. Further, the control structure 352 is conventionally adapted to provide data signals 356A corresponding to the conditions and positions sensed by the sensors 386, to the operator interface 354 and to the communications link 355, to facilitate operation of the module 350 from the interface 354 or from the computer 120 via the communications link 355.

Upon completion of processing by the inserting module 350 (FIG. 2(c)), the letters 378 may be delivered directly to the postal service, assuming manifest processing is not used. Or, the letters 378 may be processed in substantially the same manner as those shown in FIG. 3, but without performing the manual processing steps, since the stationery items 161, with or without accompanying inserts, have already been automatically folded and inserted into the cover envelope. Accordingly, the letters 378 may be fed by the module's output feeding structure 372 directly into a distinctive pouch such as the pouch 270B shown in FIG. 3. Further, either a printed or token type of passport K, L, such as the passports referred to in the discussion of FIG. 3, may be inserted into the pocket 272 of the pouch 270B and the bag 270B sealed and delivered to the Postal Service.

Assuming the provision of a printing module 200 which does not include the capability of printing graphic information including postage indicia, the postage may be printed on the cover envelope after being processed by the inserting module 350. Or, assuming the postage for a given letter was not provided in advance of processing by the insertion module 350, or a given business mailer already has apparatus which includes an inserting module 350, letter weighing module and postage meter, and does not wish to acquire the more complex printing module 200 hereinbefore discussed, the apparatus 10 (FIG. 2(d)) may include one or more weighing modules and a conventional postage metering module to which letters 378 from the inserting module 350 are successively fed.

For weighing the letters 378 (FIG. 2(d)), the apparatus 10 may include one or more weighing modules 400. The weighing module 400 is preferably a conventional standalone device which includes suitable control structure 402 for controlling the various structures and functions of the module 400. In addition, the module 400 includes an operator interface 404, which is conventionally coupled to the control structure 402 for operation thereof in response to operator input signals from the interface 404. The control structure 402 is also conventionally adapted to include a two-way serial or parallel communication link 405 for conventionally coupling the control structure 402 to an external source, exemplified by the computer 120, for providing data signals, such as the signal 406A, to the external source and for operation of the control structure 402 in response to control signals, such as the signal 406B, from the computer 120. Thus the module 400 is adapted to permit complete control of its structures and functions from an external source rather than from the operator interface 404. The module 400 additionally includes conventional scale structure 410, which may for example include a suitable envelope receiving platform mounted upon and operatively coupled to an electro-mechanical transducer, known in the art as a load cell, for providing electrical signals to the control structure 402 which are representative of the weight of an envelope 378 on the platform. In addition the weighing module 400 includes conventional feeding structure 412 for feeding envelopes 378 received one at a time from the inserting module 350, in a predetermined path of travel through the weighing module 400 as the scale structure 410 weighs the envelopes 378. The weighing module 400 additionally includes one or more motors 416 coupled to the control structure 402 and to the feeding structures 412 either directly or indirectly via one or more drive units 418. In addition, the weighing module 400 includes a plurality of sensors 420. Some of the sensors 420 are operatively associated with the feeding structure 420, for sensing the presence or absence of envelopes 378 entering the weighing module 400 and the presence or absence of envelopes 378 at various relevant positions in the envelope feed path through the module 400 and providing conventional input signals to the control structure 402 which are indicative of such conditions and positions. And, other sensors 420 are conventionally coupled to the scale 410, feeder 412, motors 416 and drive units 418 for providing data signals to the control structure 402 which are indicative of various conditions and positions of the structures 410, 412, 416 and 418, including their respective home positions. Further, the control structure 402 is adapted to provide data corresponding to the aforesaid conditions and positions to the operator interface 404 and communication link 405, to facilitate operation of the module 400 from the interface 404, or from an external source such as the computer 120 via the communications link 405.

For applying postage corresponding to the weight of a given letter received from the weighing module 400 (FIG. 2(d)), the apparatus 10 may include one or more postage metering modules, such as the module 450. The postage metering module 450 may be any conventional electronic postage meter or mailing machine equipped with a postage meter, including the structures hereinbefore discussed in the discussion of the printing module 200. Preferably the module 450 includes all of the structures and functions of the module 200 except such structures and functions which are provided for printing information on the envelope other than the postage indicia. Accordingly, the postage metering module includes the conventional two-way serial or parallel communication links, 205 and 268 and is operable in response to the insertion of a removable token K as hereinbefore discussed. Further, rather than including the accounting structure 200 an accounting module 260 may be provided. After applying the postage to the letter 378 received from the weighing module 400 the letter 378 may be processed as hereinbefore discussed and shown in FIG. 3, for manifesting bulk mailings, or the letters may be delivered directly to the Postage Service.

In general, the local computer 120 (FIG. 2(b)) may include one or more permanent programs, including for example a main line program, and programs for operating each of the modules hereinbefore discussed, and may include those including data corresponding to one or more letter formats and for reformatting letter data to conform the same to such letter formats, a data base of data corresponding to graphic information to be printed including those for postage markings and letter headings and footings, postal zip codes and corresponding bar codes, customer names and corresponding customer identification codes or sort codes, serial numbers of postage authorizing or metering or dispensing structures serviced by the computer 120, accounting routines relating to the postage available and postage used in any of such structures, and any of the other programs referred to in this application. Alternatively or for supplementing any of such programs, the computer 120 may be programmed with applications software provided by a given module 80 or inserted into the dual disk drive 153, referred to in this application. In general, the computer 120 (FIG. 2(b)) includes a main line program 600 (FIG. 4) and a plurality of module control programs 700 (FIG. 5).

The main line program 700 (FIG. 4) commences with the step 702 of conventionally initializing the computer 120, which generally includes establishing the initial voltage levels at the interface ports utilized for the control and data communications links 42, 86, 96, 104, 165, 205, 268, 305, 355, 405 and 468, for the respective modules, 12, 50, 80, 90, 100, 160, 200, 260, 300, 350, 400, 450 and 480, and setting the timers and counters. Thereafter the computer 120 communicates with the such modules and causes their respective motors and other drive units to be conventionally initialized, step 704. Step 704 entails causing the interface microprocessors of the various modules to scan the various microprocessor ports associated with the motors, drive units and sensors of the modules for determining whether or not the predetermined elements of the motor and drive units, such as their respective output shafts, are properly located for initiating operation of the various structures in the modules and, if not, the computer 120 causes the motors and drive units to drive such elements to their respective home positions.

Assuming the initialization steps 702 and 704 are completed, the program 700 enters an idle loop routine, step 706. In the idle loop routine 706 a determination is initially made as to whether or not a request or command has been received from one of the modules 12, 50, 80, 90, 100, 160, 200, 260, 300, 350 or 450, 480, from the computer's input data processing routine or from the local terminal 155, step 708. Assuming a request or command has not been received 708, processing is returned to idle 706. When a request or command 708 is received, a determination is initially made as to whether or not the request or command 708 is from one of the local modules, or the aforesaid input data processing routine hereinafter discussed in greater detail, step 710. If the request or command is from one of such modules, or the processing routine, 708, a determination is made as to whether or not it is directed to programming the computer, step 712. Assuming a determination is made that it is for programming the computer, 712, the program 700 causes the computer to process the request or command, step 714, for either storing the input program for present or future use or initializing the program 700 for ongoing utilization of the input program, depending upon the type of computer 120 employed and input program involved. Whereupon, processing is caused to be returned to idle 706. Assuming a determination is made that the request or command is not for programming the computer 712, the program 700 then implements an inquiry as to whether or not the request or command is for the local terminal, step 716. Assuming that it is, since the request or command ordinarily takes the form of a message for the local terminal, it will be assumed that the program directs the local terminal to print or display a message, step 718, whereupon the program 700 then causes processing to be returned to idle 706. If the determination is made that is it not a request or command for the local terminal 722, then, the program causes a determination to be made as to whether or not the request or command is for an external source, step 720, and, if it is, causes the request or command to be transmitted to the external source, step 722. Assuming the request or command is not concerned with either programming the computer, 712, nor with messages for the local terminal or external source, then, the request or command is presumably for execution by one of the local modules, or for analysis by the input data processing routine of the computer. Accordingly, the program 700 implements the step 724 of determining whether or not the request or command is for input data processing. And, assuming that it is, the program 700 causes the request or command to be stored, step 726, for processing on a first come first served, i.e., FIFO, basis, and processing is returned to idle 706. If however the request or command is not for input data processing, the program 700 proceeds to implementation of the steps of execution of the request or command by the appropriate module, step 728. Referring back to step 710, assuming that the request or command is not from one of the modules, or from the input data processing routine, then, the program implements the step 730 of determining whether or not it is from and to the local terminal. Assuming both of these conditions are met, presumably the request or command is a message for the local terminal. Accordingly, the program 700 implements the steps of causing the message associated with the request or command to be printed or displayed at the local terminal, step 732, followed by returning processing to idle 706. On the other hand, assuming the request or command is not from and to the local terminal, then, it is presumably from the local terminal to one of the modules. And, since it is preferable that requests or commands for the modules that come from the local terminal take precedence over those that come from the local modules, the request or command from the local terminal 730 to the modules, is caused to conventionally interrupt, step 734, processing of requests or commands from the local module and from the input data processor, 710 and 724, whereupon the request or command is executed 728. Accordingly, requests or commands from the local terminal which are for execution 728, are processed on an interrupt basis prior in time to execution of requests or commands from the local modules or from the input data processing program. With this arrangement, local module requests or commands that effect the local modules may be changed by operator input from the local terminal, prior to commencement of processing.

As hereinbefore discussed, without departing from the spirit and scope of the invention, input letter data may be in either analog or digital form as received by the computer 120 (FIG. 2(b)) for analysis and reformatting. The analysis and reformatting is implemented by the input data processing routine 800 shown in FIG. 5. The input data processing routine 800 is called up for implementing processing, either by the input modules 12, 80, 90 and 100, or by the main line computer program, step 726. The input data processing routine 800 commences with the step of making a determination as to whether or not letter data input has been received for processing, step 802, on a first in first out basis. If such input data has not been received 802, the routine 800 returns processing to idle 706. On the other hand, if the determination is made that letter data input has been received 802, the routine 800 then makes a determination as to whether or not the letter data is in analog form, step 804, and, if it is, causes the letter data to be converted to digital data by implementation of an analog to digital conversion step 806. Assuming a determination is made that the letter data is not analog data 804, but rather, is digital data, or the analog data has been converted to digital data, 806, the routine then causes the letter data to be analyzed, step 808. The analysis step 808 generally includes the steps of identifying the letter data corresponding to the addressor and addressee of the letter, their respective postal zip codes, the message included in the letter, the signature and any code, such as a customer code, bar code or sort code, included in the letter, and any data indicating that a return letter, such as a remittance slip or return envelope, is included with the letter or must be provided with the letter. Thereafter, the routine performs the step of reformatting the input letter data and adding data as needed for preparing the letter, step 810. Such processing includes but is not limited to the steps of adjusting margins and lines between identified data, choosing the font size or sizes to be used in printing the letter, adjusting line spacings, adding headings and footing, bar codes, customer codes and sort codes as needed for the type of letter, identifying the stationery items and inserts, if any, that will be utilized for printing the letter and any inserts that are to be included, calculating or utilizing a look up table for determining, or otherwise providing the postage needed for mailing the identified stationery items and inserts, if any, and providing instructions for selecting the identified stationery items and inserts, if any, and printing the reformatted letter data. Other steps that may be included in the reformatting step 810 without departing from the spirit and scope of the invention, including for example those hereinbefore discussed in connection discussing the programs of the computer 120 and those discussed throughout this application. Thereafter, the routine 800 causes a determination to be made as to whether or not the letter being processed is to be included in a manifest mail run or batch, step 814, which information may be included for example as a code associated with the letter data for flagging the letter as such, or may be provided from the local input terminal hereinbefore discussed. Assuming the letter is not to be included as one in a manifest mail run or batch, then, the letter data is augmented by the postage marking data that is to be used, step 816, including data corresponding to a given postage manufacturers graphic information, or a permit mailers serial number, is added to the reformatted letter data. In the case of a permit mailers serial number, it is understood that the postage costs previously calculated would not then be used. In addition, instructions are provided in step 816 for printing the added data on identified stationery items. Following the processing step 816, the routine 800 causes all of the foregoing letter data, added data and instructions, steps 812 and 816, to be stored and forwarded step 818, on a first in first out basis, for execution by the module routines, step 728, whereupon the routine 800 returns processing to idle 706. Assuming on the other hand that the letter is to be included in a manifest mail run or batch 814, the routine 800 implements the step of adding the manifest mail data and instructions concerning the same, step 820. Step 820, includes but is not limited to the steps of identifying and providing the postage dispenser, meter or authorizing device by serial number, providing transaction number data, zeroing the letter counter which is to count the letters included in the run or batch, zeroing the serial number generator which is used for providing consecutive serial numbers for printing on letters in the place of postage markings, adding postage marking data for printing manifest mail lines on selected stationery items or for marking permit mailings. Also pre-sort postage data for bulk mailings of presorted letters of a run or batch may be provided, as well as instructions for storing accounting data for the mail run or batch for printing, or writing into a token, the passport data pertaining to the run or batch of permit, presort or manifest mail, as the case may be. Following the processing step 820, the routine causes all of the letter data, added data and instructions, step 812 and 820 to be stored and forwarded, step 818, on a first in first out basis, for execution by the module routines, step 728 (FIG. 4), whereupon the routine 800 (FIG. 5) returns processing to idle 706.

Figure 4:
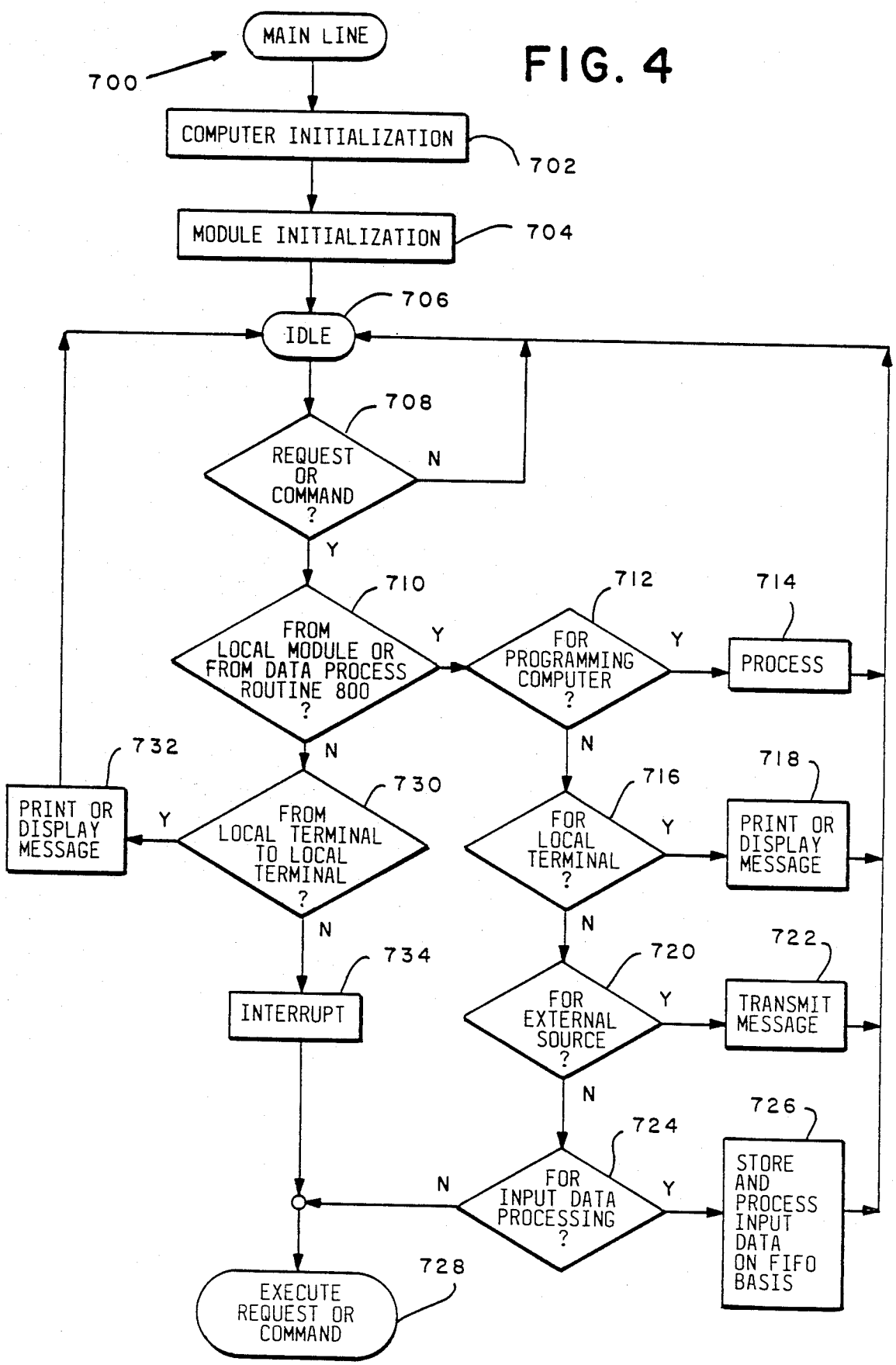
FIG. 4 is a flow chart showing the processing steps implemented by the main line program of the computer shown in FIG. 2.

Referring again to FIG. 4, and in particular to steps 710, 724 and 726, it is noted that when implementing the determination in step 710, which is concerned with whether or not a request or command is received either from a local module or from input data processing, an affirmative determination will cause requests and commands concerning the input data from the local module that is to be reformatted by input data processing routine of FIG. 4, to be processed through steps 712, 716 and 720 to step 724 before a determination is made at step 724 as to whether or not such data is to be stored and processed, step 726, by the routine 800. Such request or commands are are processed by the routine 800 and stored by the routine 800 in the course of execution of step 818, with the result that such requests or commands are executed on a first-come, first-serve basis. Although, as shown in FIG. 4, requests and commands from the various modules are preferably handled by the computer 120 on a first-come, first-serve basis, the computer 120 preferably has the capacity to handle parallel processing of requests and commands from the modules, as a result of which the computer response time for execution of any given request or command does not in any event have an effect upon the timeliness of the sheet and letter processing functions of the respective modules.

Assuming the request or command 708 (FIG. 4) is to be executed 728 by the computer routine controlling the scanning module, the scanning module routine 850 (FIG. 6(a)) is called up. The routine 850 initially implements the step 852 of making a determination as to whether or not the scanning module has received a sheet to be scanned. And, assuming that it has not, returns processing to idle 706 to permit the execution of the next request or command until a sheet has been received by the scanning module 12. Assuming one or more sheets to be scanned have been deposited in the module's stacking structure, a determination would be made in step 852 that a sheet had been received, whereupon the routine 850 causes the sheet to be fed, step 854, past the aforesaid scanning structure, as the routine 850 causes the information on the sheet to be scanned and stored as letter data, step 856, for input data processing by the routine 800 hereinbefore discussed. Thereafter, the routine 850 causes the sheets to be fed to the output stack step 858, followed by the transmission to the module of a message indicating that the request or command has been executed, step 860 (FIG. 6(e)) and then the return of processing to idle 706.

Assuming the provision of a letter opening module 50 (FIG. 2) for feeding letters to be scanned to the scanning module, and that the request or command 728 (FIG. 6(b)) pertains to the letter opening module, the letter opening module routine 880 is called-up. Whereupon the routine 880 implements the initial step of determining whether or not a letter has been received, step 882. Assuming that it has not, the routine 880 returns processing to idle 706, whereas if a letter has been received, the routine 880 causes the letter to be opened 884, followed by causing the contents of the letter to be extracted, step 886. Thereafter the routine 880 causes a determination to be made as to whether or not the letter opening module is connected to another module to which the extracted contents are to be fed, step 888, and, if it is not, the extracted contents are fed to the stack 890. On the other hand if a determination is made that the contents are to be fed to the next module, the routine 880 causes the contents to be fed to the next module, step 892. Preferably, the routine also includes processing step, following step 890, of causing an inquiry to be made as to whether or not the stack is full, step 894 and, if a determination is made that it is, causing a request for services 896 to be initiated. The request for services 896 may be, for example, be a request to the local terminal of the computer to print a message indicating that the output stack of the letter opening module is full. In each case, after the execution of the respective steps 892, 894 and 896, a message is transmitted to the module indicating that the initial request or command has been executed 860 (FIG. 6(e) followed by processing being returned to idle 706.

Assuming that the request or command 728 is to be executed by the applications software module routine, the program 700 calls up the applications software module routine 900 (FIG. 6(b)) which implements the initial step of making a determination as to whether or not applications software has been received for input to the computer, step 902. Assuming that it has not, processing is returned to idle 706. On the other hand, assuming that a determination is made that input for the computer is available, 902, the routine 900 executes the step 904 of causing the applications software to be received and stored for present or future use by the computer 120 (FIG. 2). Thereafter, the routine 900 (FIG. 6(b) causes a request-or-command-completed module, 860 (FIG. 6(e), followed by processing being returned to idle 706.

Assuming the request or command is to be executed 728 is for either the storage media module routine or communications link module routine, one or the other of such routines, or the same routine, is utilized for servicing the request or command inasmuch as the same steps are executed by both routines. Accordingly, as shown in FIG. 6(b), a request or command to be executed by either the storage media module routine or the communications link module routine, results in calling up the 930, which commences with the initial step of making a determination as to whether or not input data is available for the computer, step 932. Assuming that it is not, processing is returned to idle 706. Assuming on the other hand that input data is available for the computer, the routine 930 causes implementation of the step 934 of receiving and storing the input data, which is presumably letter data, for input data processing as hereinbefore discussed. Thereafter the routine 930 causes a message to be transmitted to the module to indicate that the request or command has been executed 860 (FIG. 6(e) and returns processing to idle 706.

Assuming the request or command is to be executed 728 by the stationery items feeding module routine, the program 700 calls up the stationery items module routine 960 (FIG. 2(b)) which implements the initial step 962 of determining whether or not all stationery items that have been identified as needed for a given letter have been received. Assuming they have not, processing is returned to idle 706. Assuming however that all such stationery items have been received, the routine causes the identified items to be fed in proper order for collation of the letter, step 964. Accordingly, the stationery items may be fed such that the envelope, if any, is initially fed, followed by feeding the last sheet of the letter first, followed by the next to the last sheet, and so on, until the first sheet of the letter is fed, to ensure that when the sheets are accumulated in a stacker, folder, or inserter, one on top of the other, the letter information printed thereon is in the proper sequence. After feeding the stationery items as noted, the routine executes the step of determining whether or not a passport is to be printed, step 966. If it is not, processing is returned to idle 706, whereas if a passport is to be printed, the identified stationery item for printing the passport, be it a form or blank sheet, is fed for passport printing purposes, step 968. Thereafter, the routine 960 implements the step of causing a message to be transmitted to the feeding module indicating that the request or command has been executed 860 (FIG. 1(e) and then causes processing to be returned to idle 706.

Assuming the request or command 728 (FIG. 6(b) is for execution by the printing module routine, the printing module routine 1000 (FIG. 6(c) is called up. The routine 1000 initially implements the step 1002 of making a determination of whether or not tape is available or a stationery item has been received, depending upon the mode of operation dictated by the computer program 700, for example, in accordance with operator input from the local terminal. Assuming the determination is negative, the routine 1000 returns processing to idle 706. Assuming however tape is available or a stationery item has been received 1002, the routine then causes a determination to be made as to whether or not postage or passport data is needed, step 1004, it being noted that information corresponding to such data is not printed on all stationery items. If postage or passport data is not needed, then, the routine 1000 implements the step 1006 of causing the stationery item to be fed and the printing structure to print information corresponding to reformatted data and other data, if any, on the stationery item. Thereafter, the routine 1000 causes a determination to be made of whether or not there is a next module, step 1008, to which the printed stationery items is to be fed, and, assuming there is one, implements the step 1010 of causing the printed stationery item to be fed to the next module. Whereupon a message is transmitted to the module indicating that the request or command has been executed, 860 (FIG. 6(e)), followed by the returning processing to idle 706. Assuming however that it is determined that there is no next module, step 1008 (FIG. 6(c), then, the routine 1000 causes the printed stationery item to be fed to the module's output stack, step 1012. Preferably, the routine 1000 then additionally causes a determination to be made of whether or not the stack is full, step 1014, and assuming that it is not, transmits a message to the module indicating that the request or command has been executed, 860 (FIG. 6(e)), followed by returning processing to idle 706. Assuming however that the stack is full, 1014 (FIG. 6(c)), then, the routine implements the step of requesting service 1016, followed by transmission of the aforesaid message 860 and the return of processing to idle 706. Referring back to step 1004, and assuming it is determined that postage or passport data is needed, then, the routine implements the step 1020 of determining whether or not the postage value that is to be printed has been authorized to be printed, or the passport data has been received for printing, as the case may be. Assuming that it has not, as the case may, the routine 1002 implements the step 1022 causing the accounting module routine to be executed, as hereinafter discussed. Assuming implementation of step 1020 results in a determination that postage printing has been authorized or the passport data has been received, then the routine 1000 implements the step 1024 of determining whether or not a stationery item is required. If it is not, then, tape printing is involved. Accordingly, the routine 1000 implements the step of causing tape to be fed into position for printing, step 1026, successively followed by implementation of the steps of causing postage to be printed on the tape, step 1028, cutting the fed tape from the remainder of the supply of tape, step 1030, feeding the cut length of postage bearing tape to the stack, step 1032 and requesting service, step 1034. The service request 1034 may be a request to the local terminal causing the terminal to print a message indicating that the postage tape is in the stack. Thereafter, a request or command execution complete message is transmitted to the module, step 860 (FIG. 6(e)), followed by processing being returned to idle 706. Referring back to step 1024 (FIG. 6(c)), and assuming a stationery item is required, then, the routine implements the step of determining whether or not a passport is to be printed, step 1036. Assuming that it is, the routine causes the stationery item to be fed and the printing structure to print the information corresponding to the passport data on the stationery item, step 1038, followed by causing a request for service to be initiated, step 1040. The service request in this instance may be a request causing a message to be printed at the local terminal which indicates that a printed passport has been fed to the printing module's output stacker. Thereafter the routine 1000 causes the transmission of a message to the module indicating that the request or command has been executed, step 860(FIG. 6(e)), followed by causing processing to be returned to idle 706. Returning again to step 1036, and assuming a passport is not to be printed, then, the stationery item on which postage, as well as other information, if any, is to be printed is caused to be fed and printed, step 1042. Thereafter, the routine 1000 implements the step of determining whether or not there is a next module, step 1044, and, assuming that there is, causes the printed stationery item to be fed to the next module, step 1046, followed by causing a request-or-command completed message to be transmitted to the module, step 806 (FIG. 6(e)), and then the return of processing to idle 706. Assuming however that there is no next module 1044, then, the routine 1000 causes the printed stationery item to be fed to the module's output stack, step 1048, and then implement an inquiry as to whether or not the stack is full, step 1050. If this inquiry is answered positively 1050, the routine causes a request for services or command executed messages to the module, 860 (FIG. 6(e)), and return of processing to idle 706. If however it is determined that the stack is not full, 1050 (FIG. 6(c)), then the routine transmits a message to the module, 860 (FIG. 1(e)), indicating that the request or command has been executed, and returns processing to idle 706.

Figure 6D:
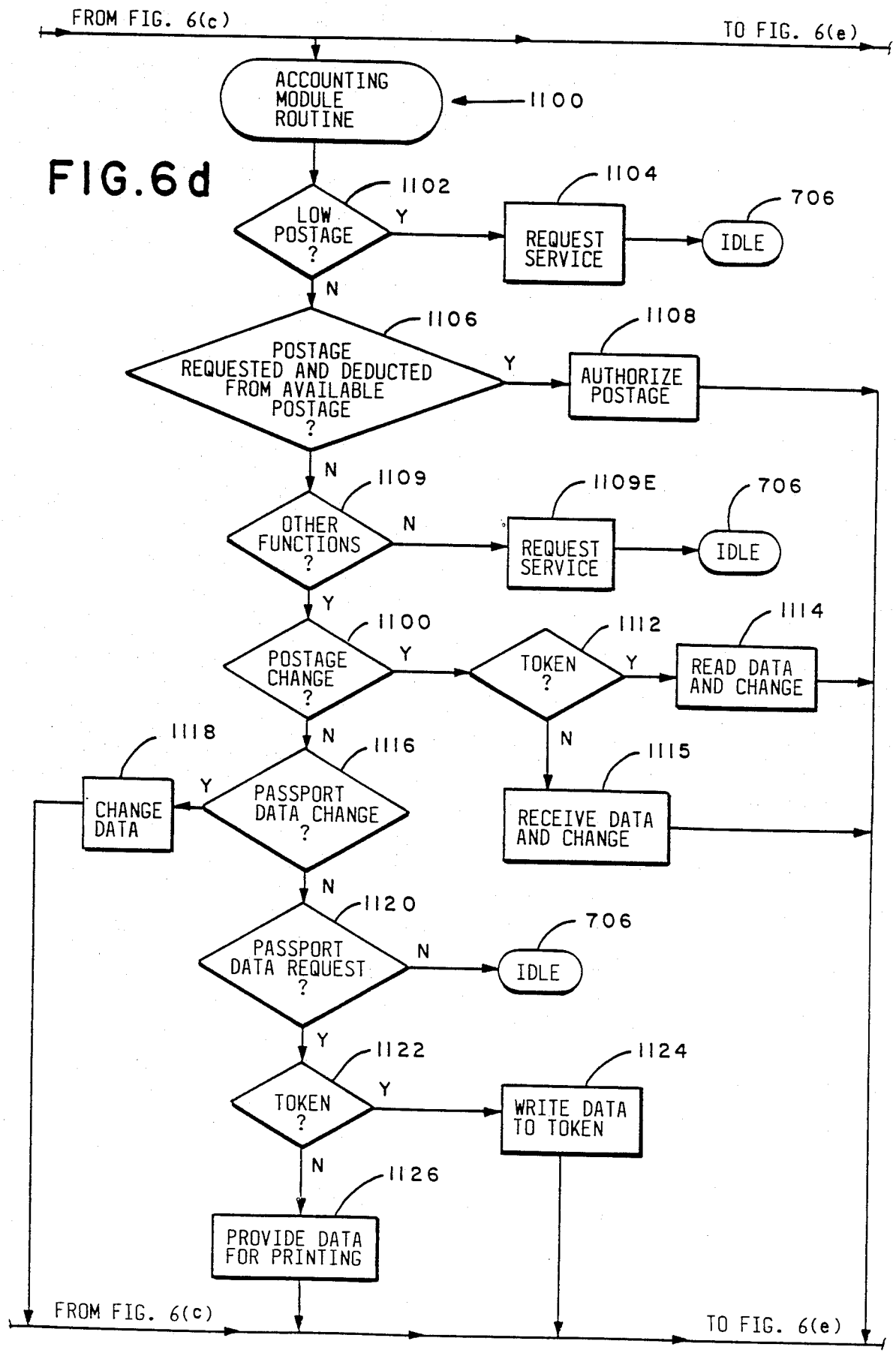
FIG. 6(d) is a flow chart showing the processing steps of the accounting module program of the computer shown in FIG. 2(b) for controlling the respective accounting modules shown in FIG. 2(d) and the accounting structure shown as included in any printing module shown in FIG. 2(d); and, FIG. 6(e) is a flow chart showing the processing steps implemented by the programs of the computer shown in FIG. 2(b) for controlling operation of the folding, inserting and weighing modules, and other printing and accounting modules shown in FIGS. 2(c) and 2(d).

Assuming the request or command 728 is for execution by the accounting module routine, the printing module routine 1100 (FIG. 6(d)) is called up by the program 700. The routine 1100 initiates processing with the step of inquiring whether or not the postage available for printing is low 1102. In this connection it is noted that a given postage dispensing or metering device, or device authorized to permit such printing or dispensing ordinarily has stored therein a given postage amount which is available for printing and, in addition, a value representing the lowest amount of available postage that the user desires to have available before recharging the postage printer or dispenser with an additional postage amount which is added to the postage amount available for printing or dispensing. Accordingly, before preparing a run or batch of, for example, manifest mail, it is desirable to be sure that the available postage is not low. Accordingly, assuming that the determination is in step 1102 indicates that the postage is low, the routine 1100 implements the step of causing service to be requested 1104 followed by returning processing to idle 706, to permit the user to recharge the postage metering or dispensing device with additional postage. The request for service may for example take the form of causing the local terminal to print a message indicating that the postage available amount stored in the particular postage metering or dispensing device is low. Assuming however that the determination made in step 1102 is negative, then, the routine 1100 implements the step 1106 of determining whether or not the postage which has been requested to be deducted from the postage available has been deducted. Assuming that it has, then the routine 1100 implements the step of authorizing postage printing 1108, followed by causing a message transmission to the module indicating that the request or command has been executed, 806 (FIG. 6(e)), and the return of processing to idle 706. Assuming however that the postage requested has not been deducted, then, the routine 1100 (FIG. 6(d)) implements the step of inquiring whether or not the request or command is concerned with a function other than one concerning postage, step 1109. If it does not, then the routine 1100 implements the step 1109E, of requesting service on an emergency basis, it being assumed that a malfunction exists in the postage deduction or authorization processing routine, followed by processing being returned to idle 706. In this connection it is noted that an emergency service request may take the form of causing a message to be printed at the local computer terminal, and, in addition causing activation of a visual or audio alarm to obtain the immediate attention of an operator. Assuming that the request or command is concerned with another function to be performed by the accounting module routine 1100, the, the routine inquires as to whether or not it is concerned with a change in the postage amount available for printing, step 1100. Since this may be implemented by utilization of a token or use of the accounting modules communication link with an external source, if the postage change inquiry is an affirmation, 1110, then the routine 1100 executes the step of determining whether or not the postage change is to be made utilizing a token, step 1112. Assuming that it is, the data concerning the postage change is caused to be read from the token, and the postage available data is changed to reflect the change, step 1114; whereas if the postage change is to be received from an external source via the modules communication link, the data concerning the change is caused to be received, and the postage available data is changed to reflect that change, step 1115. In either instance the routine's processing steps 1114 and 1115 are followed by the transmission of a message indicating that the request or command has been executed, step 860 (FIG. 6(e)), and processing is returned to idle 706. Assuming however that it is determined that a postage change is not involved, step 1110 (FIG. 6(d)), then, the routine implements the step 1116 of determining whether or not a passport data change is involved, step 1116. If it is, the routine 1100 implements the step 1118 of making the change, followed by the implementation of the transmission to the module of a message indicating that the request or command has been executed step 860 (FIG. 6(e)), and the return of processing to idle 706. Assuming no change is to be made in the stored passport data 1116, then the current passport data may be in the process of being requested for token storage. Accordingly, the routine 1100 implements the step 1120 of determining whether or not this is the case, and, if it is not, returns processing to idle 706, or, if it is determines whether or not a token has been made available, step 1122. Assuming a token is available 1122, the routine 1100 causes the passport data to be written into the storage media of the token, step 1124, or provided to the printing module routine for printing step 1126, followed by transmission to the module of a message indicating that the request or command has been executed, step 806 (FIG. 6(e)), and the return of processing to idle 706.

Assuming the request or command 728 is for execution by the folding module routine, that routine 1200 (FIG. 6(e)) is called up and initially executes the step 1202 of determining whether or not all the stationery items that are to be provided for a given self-mailer have been received. If they have not, 1202, then processing is returned to idle 706. Assuming however that all the stationery items have been received 1202, then the routine 1200 executes the successive steps of causing the accumulated, collated, stationery items to be grasped and fed, step 1204, through the folding structure where the routine 1200 causes the collation to be folded, step 1206, then through the sealing structure where the routine 1200 causes the folded collation to be sealed, step 1208, and then into the mailing pouch, step 1210. Preferably, the routine 1200 also makes a determination as to whether or not the pouch is full, step 1212. And, assuming that it is, initiates the step 1214 of requesting service. After step 1214 or if a determination is made that the pouch is not full, the routine 1200 causes a message to be transmitted to the module which indicates that the request or command has been executed 860 and processing is returned to idle 706.

Assuming the request or command is concerned with the inserting module, the inserting module routine 1300 is called up. The routine 1300 initiates processing by making a determination of whether or not the envelope for the letter has been received, step 1302, and, assuming that it has not caused processing to be returned to idle 706. Assuming that it is determined, 1302, that the envelope has been received, the routine causes the envelope to be fed to the envelope opening structure of the inserting module where it is opened, step 1304, in anticipation of receiving the contents of the letter. Thereafter the routine executes the step 1306 of determining whether or not other inserts are to be provided. Assuming that they are, the routine causes the inserts to be fed, step 1308, to the accumulator structure of the inserter before the stationery items are fed. If inserts are not involved, step 1306, or after the inserts are fed, step 308, then, the routine executes the step of determining whether or not the stationery items for the letters have been received, step 1310. Assuming that they have not been received, 1310, the routine 1300 returns processing to idle 706. Assuming a determination is made that a stationery item for the letter has been received, step 1310, the routine causes the same to be fed, step 1312, which results in feeding the inserts to the accumulating structure for deposit, where, the inserts, if any, have already been deposited. Thereafter, the routine 1300 executes the step 1314 of determining whether or not all the stationery items for the letter being processed have been fed to the accumulator structure of the inserting module. Assuming they have not, the routine causes processing to loop through step 1314 until all stationery items are available. Whereupon the determination is answered positively, step 1314 and the routine 1300 then causes the accumulation of stationery items and inserts, if any, to be grasped and fed, through the folding structure, step 1316, where the routine 1300 causes the accumulation of stationery items, and inserts, if any, to be folded, step 1318, then to the inserting structure where the routine 1300 causes the folded accumulation to be inserted, into the opened envelope, step 1320, and then to the sealing structure where the routine 1300 causes the letter envelope flap is sealed, step 1322. Thereafter, the routine 1300 implements the step 1324 of inquiring whether or not the letter is to be fed to a next module. Assuming that it is the routine 1300 implements the step 1326 of causing the letter to be fed to the next module, followed by causing transmission to the module of a message indicating that the request or command has been executed, 860, and then returning processing to idle 706. If however, a next module is not involved, step 1324, then routine 1300 causes the letter is fed to a pouch 1328. Thereafter, the routine 1300 preferably includes the steps 1330 of determining whether or not the pouch is full, and, if it is causing service to be requested 1332. Whether or not service is requested, 1330 or 1332, the routine 1300 then causes a message to be transmitted indicating that the request or command has been executed, 860, and returning processing to idle 706.

Assuming the request or command is for execution of the weighing module routine, that routine 1400 is called up, and executes the step 1402 of determining whether or not a letter has been received. Assuming that it has not, the routine 1400 returns processing to idle 706. On the other hand, assuming receipt of a letter 1402, the routine 1400 causes the letter to be fed to the weighing modules scale structure, step, where the letter is weighed and then causes data to be generated which corresponds to the postage cost that is to be printed on the letter envelope for mailing the letter, step 1408. Whereupon the routine causes the feeding structure of the weighing module to feed the letter to the next module, i.e., a printing module operable in accordance with the printing module routine hereinbefore discussed. After step 1410, the routine causes a request-or-command-executed message to be transmitted, to the weighing module 860 and processing to be returned to idle 706.

Assuming the request or command is for operation of a printing module to which a weighed letter is fed, the printing module may be controlled by a routine that is the same as, or a simplified version of, the printing module routine 1000, in combination with the accounting module routine 1100, as hereinbefore discussed, depending upon the complexity of the printing and accounting modules needed to perform the operation performed on the weighed letter subsequent to processing by the weighing module. Accordingly, as shown in FIG. 6(e), for the purposes of this disclosure, it will be assumed that printing and accounting module for 1000 and 1100 are respectively called up as needed for printing postage on weighed letters which are fed to the printing module from the weighing module, and that such routines are implemented as hereinbefore discussed for printing postage on the weighed letter envelopes.

In accordance with the objects of the invention there has been disclosed letter processing systems that are particularly suitable for preparing and processing outgoing letter mail, including mail for bulk mailing purposes.

What is claimed is:

1. Apparatus for printing letter including information parts in proper locations on a stationery item, said apparatus comprising:
   a. printing means,
   b. input means including a letter data signal representative of information having a format, said information having a plurality of information parts, and
   c. computer means coupled to said input means and including a plurality of memory locations, said computer means further including: means coupled to said printing means and responsive to said letter data signal for identifying each of said information parts; means for converting said identified information parts of said letter data into a plurality of data parts; means for storing each of said data parts into separate memory locations; processing means including stored sequence data and stored location data corresponding to respective ones of said identified information parts; means coupled to said processing means and responsive to said sequence data and said location data for retrieving from said means for storing at least one of said data parts corresponding to an identified information part in accordance with said sequence and location of said information part, said computer means coupled to said printing means to print on said stationery item in proper sequence and location retrieved information part corresponding to a selected data part.

2. The apparatus according to claim 1 wherein said input means includes means for storing said information in a storage media, and means for detecting said stored information and generating said letter data signal corresponding thereto.

3. The apparatus according to claim 2, wherein said information is optically stored in said storage media, and said detecting means including means for optically detecting said information.

4. The apparatus according to claim 2, wherein said information is magnetically stored in said storage media, and said detecting means including means for magnetically detecting said information.

5. The apparatus according to claim 2, wherein said information is electronically stored in said storage media, and said detecting means including means for electronically detecting said information.

6. The apparatus according to claim 2, wherein said information is mechanically stored in said storage media, and said detecting means including means for mechanically detecting said information.

7. The apparatus according to claim 2, wherein said information is mechanically stored in said storage media, and said detecting means including means for optically detecting said information.

8. The apparatus according to claim 2, wherein said information is mechanically stored in said storage media, and said detecting means including means for electronically detecting said information.

9. The apparatus according to claim 2, wherein said storage media is a tape.

10. The apparatus according to claim 2, wherein said storage media is a disk.

11. The apparatus according to claim 2, wherein said storage media is a computer register.

12. The apparatus according to claim 1, wherein said providing means includes means for storing said letter data in a storage media, and said preparing means including means for detecting said letter data and providing said signal representative thereof.

13. The apparatus according to claim 12, wherein said letter data is optically stored in said storage media, and said detecting means including means for optically detecting said letter data.

14. The apparatus according to claim 12, wherein said letter data is magnetically stored in said storage media, and said detecting means including means for magnetically detecting said letter data.

15. The apparatus according to claim 12, wherein said letter data is electronically stored in said storage media, and said detecting means including means for electronically detecting said letter data.

16. The apparatus according to claim 12, wherein said letter data is mechanically stored in said storage media, and said detecting means including means for mechanically detecting said letter data.

17. The apparatus according to claim 12, wherein said letter data is mechanically stored in said storage media, and said detecting means including means for optically detecting said letter data.

18. The apparatus according to claim 12, wherein said letter data is mechanically stored in said storage media, and said detecting means including means for electronically detecting said letter data.

19. The apparatus according to claim 12, wherein said storage media is a tape.

20. The apparatus according to claim 12, wherein said storage media is a disk.

21. The apparatus according to claim 9, wherein said storage media is a computer register.

22. The apparatus according to claim 1, wherein said computer means is a first computer means, and said providing means including second computer means remotely located from said first computer means, and said preparing means including means for transmitting said signal from said second computer means to said first computer means.

23. The apparatus according to claim 1, wherein said providing means includes, means for scanning a sheet, said sheet including said information, and said scanning means including means for generating said signal in response to detection of said information.

24. The apparatus according to claim 1, wherein said providing means includes facsimile communication means, and said facsimile communication means including means for generating said signal.

25. The apparatus according to claim 1, wherein said preparing means includes means for programming said computer means.

26. The apparatus according to claim 1, wherein said computer means includes means for programming said computer means.

27. The apparatus according to claim 1, wherein said computer means includes means for causing said printing means to print postage on said stationery item.

28. The apparatus according to claim 1, wherein one of said information parts is the address of the addressor of said stationery item.

29. The apparatus according to claim 28, wherein said computer means includes means for storing a telephone number of the addressor of said stationery items, and said computer means including means for causing said printing means to print said telephone number.

30. The apparatus according to claim 1, wherein one of said information parts is the address of the addressee of said stationery item.

31. The apparatus according to claim 30, wherein said computer means includes means for storing a code assigned to the addressee of said stationery item, and said computer means including means for causing said printing means to print said code on said stationery item.

32. The apparatus according to claim 1, wherein one of said information parts is a postal zip code.

33. The apparatus according to claim 1, wherein said computer means includes means for providing a calendar date corresponding to the date of printing said stationery item, and said computer means including means for causing said printing means to print said calendar date on said stationery item.

34. The apparatus according to claim 1, wherein one of said information parts is the signature of the addressor of said stationery item.

35. The apparatus according to claim 1, wherein one of said information parts is the message part of said information.

36. The apparatus according to claim 1, wherein each of said information parts is printed on said stationery item.

37. The apparatus according to claim 36, wherein said computer means includes means for providing a postage value for mailing said stationery item, and said computer means including means for causing said printing means to print said postage value on said stationery item.

38. The apparatus according to claim 1, wherein said stationery item is a first stationery item, said letter includes a second stationery item, said computer means including means for causing said printing means to print on said second stationery item at least one of said selected parts.

39. The apparatus according to claim 38, wherein said computer means includes means for a postage value for mailing said first and second stationery items, and said computer means including means for causing said printing means to print said postage value on one of said stationery items.

40. The apparatus according to claim 38, wherein one of said stationery items is a sheet and the other of said stationery items is an envelope.

41. The method of preparing for printing a letter including information parts in proper sequence and location on a stationery item, said method comprising the steps of:

a. generating a signal representative of information having a format, said information having a plurality of information parts, b. feeding said signal to a computer;

c. identifying in said computer each of said information parts;

d. converting said identified information parts of said letter data into a plurality of data parts corresponding to each of said identified information parts;

e. storing each of said data parts corresponding to an identified information part into separate memory locations;

f. retrieving from said storage locations at least one of said data parts in accordance with a stored sequence data and stored location data corresponding to respective ones of said identified information parts; and g. printing on said stationery item in proper sequence and location each information part corresponding to a selected data part.

42. The method according to claim 41, wherein the providing step includes the steps of detecting said information and generating said signal.

43. The method according to claim 41, wherein said providing step includes the steps of transmitting said signal from a remote location.

44. The method according to claim 41, including the step of printing on said stationery item a postage value for mailing said stationery item.

45. The method according to claim 41, including the step of printing on said stationery a code identifying the addressee of said stationery item.

46. The method according to claim 41, including the step of printing a postal bar code on said stationery item.

47. The method according to claim 41, including the of printing a signature on said stationery item.

48. The method according to claim 41, including the step of printing a date of preparation on said stationery item.

49. Apparatus for automatically printing, from an input letter, an output letter including information parts in proper sequence and location on a stationery item, said apparatus comprising:

a. input means for inputting a letter from which output letter data is derived, b. means connected to said input means for scanning said letter and deriving an input letter data signal representative of information having a format, said information having a plurality of information parts, c. computer means including a plurality of memory locations, said computer means further including: means for storing said input letter data signal; a data base containing a plurality of data groups in defined format, means for comparing coupled to said means for storing said input letter data signal and to said data base for comparing said input letter data signal with said data base for identifying each of said information parts; means for converting said identified information parts of said letter data into a plurality of data parts; means for storing each of said data parts into separate memory locations; said data base also including stored sequence data and stored location data corresponding to said identified information parts; processing means coupled to said data base and to said memory locations and responsive to said stored sequence of printing data and location data corresponding to said identified information parts for retrieving from said means for storing at least one of said data parts corresponding to an identified information part in accordance with said sequence and location; and d. printing means, said computer means coupled to said printing means and responsive to said computer means to print on said stationery item in proper sequence and location said retrieved information part corresponding to a selected data part.

50. The apparatus according to claim 49, wherein said input means includes means for accepting a sealed envelope, means for opening said envelope, means for extracting the contents thereof, and means for feeding said contents to said means for scanning.

51. The apparatus according to claim 49, wherein said apparatus further includes means for deriving postage data from said information parts, said computer means coupled to said printing means and responsive to said postage data for causing the printing of postage associated with said stationery item.

52. The apparatus according to claim 49, wherein said apparatus further includes means coupled to said printing means for folding, sealing and inserting said stationery item, and means for placing said item into the postal service for delivery.

53. The apparatus of claim 49, wherein said computer means further includes first means responsive to one of said information parts for computing the weight of said output letter, second means responsive to another information part for computing discounts of postage based upon bulk mail rates, third means responsive to another information part for determining destination, fourth means responsive to said first, record and third means to calculate postage, and wherein said printing means is responsive to said fourth means for printing said postage on surface associated with and output letters.

* * * * *